United States Patent
Park et al.

(10) Patent No.: US 11,487,576 B2
(45) Date of Patent: Nov. 1, 2022

(54) MEMORY CONTROLLER AND METHOD-CONTROLLING SUSPEND MODE

(71) Applicant: SAMSUNG ELECTRONICS CO., LTD., Suwon-si (KR)

(72) Inventors: Sng-Hoon Park, Hwaseong-si (KR); In-Soo Kim, Seongnam-si (KR); Jong-Won Kim, Suwon-si (KR); Sang-Kwon Moon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/318,554

(22) Filed: May 12, 2021

(65) Prior Publication Data
US 2021/0279094 A1    Sep. 9, 2021

Related U.S. Application Data

(63) Continuation of application No. 16/717,720, filed on Dec. 17, 2019, now Pat. No. 11,036,544.

(30) Foreign Application Priority Data

Feb. 12, 2019    (KR) .................... 10-2019-0016356

(51) Int. Cl.
*G06F 12/00*    (2006.01)
*G06F 9/48*    (2006.01)
*G06F 3/06*    (2006.01)

(52) U.S. Cl.
CPC ............ *G06F 9/485* (2013.01); *G06F 3/0604* (2013.01); *G06F 3/0634* (2013.01); *G06F 3/0673* (2013.01)

(58) Field of Classification Search
CPC ...... G06F 3/0619; G06F 3/0647; G06F 3/067; G06F 11/1451; G06F 11/1464; G06F 11/1469
See application file for complete search history.

(56) References Cited

U.S. PATENT DOCUMENTS

| | | |
|---|---|---|
| 5,940,861 A | 8/1999 | Brown et al. |
| 6,081,870 A | 6/2000 | Roohparvar |
| 6,721,854 B1 | 4/2004 | Asano et al. |
| 6,930,925 B2 | 8/2005 | Guo et al. |
| 8,495,332 B2 | 7/2013 | Wakrat et al. |
| 9,941,014 B2 | 4/2018 | Lee |

(Continued)

FOREIGN PATENT DOCUMENTS

| | | |
|---|---|---|
| KR | 1020180082137 | 7/2018 |
| KR | 1020190019364 | 2/2019 |

*Primary Examiner* — John A Lane
(74) *Attorney, Agent, or Firm* — Volentine, Whitt & Francos, PLLC

(57) ABSTRACT

A memory controller is disclosed. The memory controller is configured to control the execution of a suspend operation by a memory device. The memory controller includes: a processor configured to output an operation control signal when the memory device is performing a program/erase operation; and a suspend operation manager configured to output suspend mode change information based on the operation control signal and suspend information, wherein the processor is further configured to control the memory controller such that the memory controller outputs a suspend mode change command and a suspend command based on the suspend mode change information.

11 Claims, 21 Drawing Sheets

(56) References Cited

U.S. PATENT DOCUMENTS

| | | |
|---|---|---|
| 2002/0035661 A1 | 3/2002 | Roohparvar |
| 2006/0161727 A1 | 7/2006 | Surico |
| 2008/0129445 A1 | 6/2008 | Kraimer |
| 2012/0173792 A1 | 7/2012 | Lassa et al. |
| 2013/0198451 A1 | 8/2013 | Hyun et al. |
| 2014/0047167 A1 | 2/2014 | Kwak |
| 2015/0113236 A1* | 4/2015 | Kim .................... G06F 13/4239 |
| | | 711/154 |
| 2016/0306553 A1 | 10/2016 | Ellis et al. |
| 2017/0115891 A1 | 4/2017 | O'Krafka et al. |
| 2017/0168752 A1* | 6/2017 | Micheloni ............. G06F 3/0688 |
| 2017/0199670 A1 | 7/2017 | Bennett |
| 2017/0285969 A1 | 10/2017 | Madraswala et al. |
| 2018/0004421 A1 | 1/2018 | Kang |
| 2018/0024772 A1* | 1/2018 | Madraswala ......... G06F 3/0679 |
| | | 711/103 |
| 2018/0081589 A1* | 3/2018 | Micheloni ............... G06F 12/00 |
| 2018/0129445 A1* | 5/2018 | Shin .................... G06F 12/0246 |
| 2018/0151237 A1 | 5/2018 | Lee et al. |
| 2018/0197593 A1 | 7/2018 | Lee |
| 2019/0050312 A1 | 2/2019 | Li |
| 2019/0057742 A1 | 2/2019 | Jeon et al. |
| 2019/0220220 A1* | 7/2019 | Kim ...................... G06F 3/0611 |
| 2019/0227736 A1* | 7/2019 | Hong ................... G06F 3/0673 |
| 2019/0392910 A1 | 12/2019 | Lee |
| 2020/0117378 A1* | 4/2020 | Hsu ...................... G06F 3/0619 |
| 2020/0210098 A1 | 7/2020 | Smionescu |
| 2020/0273523 A1 | 8/2020 | Donati et al. |
| 2021/0050062 A1* | 2/2021 | Park ....................... G11C 16/16 |
| 2021/0357155 A1* | 11/2021 | You ....................... G06F 3/0634 |

* cited by examiner

MEMORY CONTROLLER AND METHOD-CONTROLLING SUSPEND MODE

CROSS-REFERENCE TO RELATED APPLICATION

This is a Continuation of U.S. application Ser. No. 16/717,720, filed Dec. 17, 2019, and a claim of priority under 35 U.S.C. § 119 is made to Korean Patent Application No. 10-2019-0016356 filed on Feb. 12, 2019 in the Korean Intellectual Property Office, the subject matter of which is hereby incorporated by reference.

BACKGROUND

The inventive concept relates to method of controlling the execution of a suspend mode by a memory device in a memory system. These methods may be used to determine an appropriate suspend mode for the suspend operation.

A semiconductor memory device is a memory device implemented by using a semiconductor such as silicon (Si), germanium (Ge), gallium arsenide (GaAs), or indium phosphide (InP). Semiconductor memory devices may be broadly divided into volatile memory devices and nonvolatile memory devices.

A nonvolatile memory device is a memory device in which stored data is not erased even when a power supply is cut off. Nonvolatile memory devices include read-only memory (ROM), programmable read-only memory (PROM), erasable programmable read-only memory (EPROM), electrically erasable programmable read-only memory (EEPROM), flash memory devices, phase-change random-access memory (PRAM), magnetic random-access memory (MRAM), resistive random-access memory (ReRAM), ferroelectric random-access memory (FeRAM), and the like. Flash memory devices may be broadly divided into NOR-type flash memory devices and NAND-type flash memory devices.

SUMMARY

Embodiments of the inventive concept provide memory controller(s) and method(s) that may be used to control the execution of a suspend operation by a memory device.

According to an aspect of the inventive concept, there is provided a memory controller configured to control the execution of a suspend operation by a memory device, the memory controller including: a processor configured to provide an operation control signal and suspend information, and a suspend operation manager configured to provide suspend mode change information in response to the operation control signal and the suspend information, wherein the processor is further configured to provide a suspend mode change command and a suspend command in response to the suspend mode change information.

According to another aspect of the inventive concept, there is provided a control method performed by a memory controller to control the execution of a suspend operation by a memory device. The control method includes; receiving a read request from a host while the memory device is executing a program/erase (P/E) operation, receiving suspend information associated with the suspend operation, and communicating a first command from the memory controller to the memory device such that the memory device performs the suspend operation using a cancel mode when the suspend information is less than a threshold, else communicating a second command from the memory controller to the memory device such that the memory device performs a suspend operation using an on-going mode when the suspend information is not less than the threshold.

According to another aspect of the inventive concept, there is provided a control method performed by a memory controller to control the execution of a suspend operation by a memory device. The control method includes; receiving a request set from a host, receiving a read request from a host, in response to the read request, receiving suspend information associated with the suspend operation from the memory device, in response to at least one of the suspend information and the request set, determining a suspend mode for the suspend operation as either a cancel mode or an ongoing mode, and communicating at least one of a suspend command and a suspend mode change command to the memory device in response to the determination of the suspend mode.

According to another aspect of the inventive concept, there is provided a non-transitory computer-readable recording medium having stored therein a program for executing a control method for controlling the execution of a suspend operation by a memory device. The control method includes; receiving a request set and a read request from a host, receiving suspend information associated with the suspend operation, determining a suspend mode for the suspend operation in response to at least one of the suspend information and the request set, and communicating a suspend mode change command to the memory device in response to the determined suspend mode.

According to another aspect of the inventive concept, there is provided a memory system including; a plurality of memory chips, and a memory controller configured to control execution of a suspend operation by at least one of the plurality of memory chips. The memory controller includes; a processor configured to output an operation control signal when the at least one of the plurality of memory chips is performing a program/erase operation, and a suspend operation manager configured to output suspend mode change information based on the operation control signal and suspend information. The processor is further configured to control the memory controller such that the memory controller outputs a suspend mode change command and a suspend command based on the suspend mode change information.

BRIEF DESCRIPTION OF THE DRAWINGS

Embodiments of the inventive concept may be more clearly understood from a review of the following detailed description taken in conjunction with the accompanying drawings in which.

DETAILED DESCRIPTION

Hereinafter, embodiments of the inventive concept will be described in some additional detail with reference to the accompanying drawings.

Figure 1:
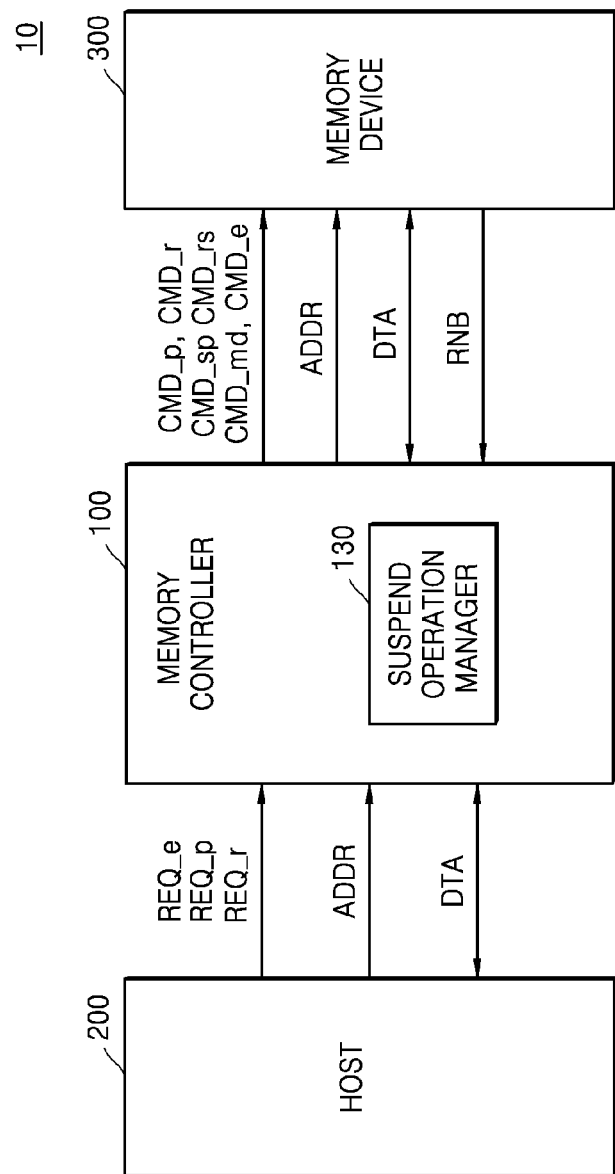
FIG. 1 is a block diagram of a memory system according to an embodiment of the inventive concept.

FIG. 1 is a block diagram of a memory system 10 according to an embodiment of the inventive concept.

Referring to FIG. 1, the memory system 10 comprises a memory controller 100, a host 200 and a memory device 300, wherein the memory controller 100 includes a suspend operation manager 130. Each of the memory controller 100, host 200, and memory device 300 may be variously implemented as one or more semiconductor chip(s), semiconductor package(s) and/or semiconductor module(s). For example, the memory controller 100 may be implemented as an application processor, separate from or associated with the host 200.

The host 200 may variously communicate data operation request(s) REQ and associated address(es) ADDR to the memory controller 100. In associated with certain request(s), data DTA (e.g., read data and/or write data) may be communicated between the memory controller 100 and host 200. The data operation request(s) REQ may include a read request REQ_r, a program (or write) request REQ_p, and/or an erase request REQ_e, respectively associated with one or more read operation(s), program (or write) operation(s), and/or erase operation(s).

Thus, the memory controller 100 may be used to control access to the memory device 300 in response to various request(s) issued by the host 200. Those skilled in the art will recognize that memory controller 100 may perform read, program, and/or erase operations on the memory device 300 by variously providing address(es) ADDR, command(s) CMD, control signal(s), and the like to the memory device 300. That is, the memory controller 100 may control the memory device 300 to read data DTA stored in the memory device 300 in response to a read request REQ_r received from the host 200. The memory controller 100 may control the memory device 300 to program (or write) data DTA to the memory device 300 in response to a program request REQ_p received from the host 200. And the memory controller 100 may control the memory device 300 to erase data DTA stored in the memory device 300 in response to an erase request REQ_e received from the host 200.

The memory controller 100 may be used to determine whether the memory device 300 is performing a program operation or an erase operation (hereafter, referred to as a "program/erase operation" or a "P/E operation"). For example, the memory controller 100 may determine that the memory device 300 is performing a P/E operation upon communicating a program command CMD_p or an erase command CMD_e to the memory device 300. Alternately, the memory controller 100 may determine that the memory device 300 is performing a P/E operation upon receiving a program request REQ_p or an erase request REQ_e from the host 200.

Under certain operating conditions, the memory controller 100 may communicate a suspend command CMD_sp to the memory device 300. For example, during the execution of a P/E operation by the memory device 300, the memory controller 100 may communicate a suspend command CMD_sp to the memory device 300 upon receiving a read request REQ_r from the host 200. In this regard, the execution of a read request by the memory controller 100 and memory device 300 may have a higher operational priority than continued execution of an ongoing P/E operation. Accordingly, the memory device 300 may suspend the execution of a P/E operation in response to the suspend command CMD_sp.

The memory device 300 and/or the memory controller 100 may be configured to selectively execute a suspend operation according to one of a plurality of suspend modes. For example, the memory device 300 may execute the suspend operation under the control of the memory controller according to a first mode (e.g., a "cancel mode") or a second mode (e.g., an "on-going mode)). Thus, assuming the ongoing execution of a P/E operation by the memory device 300, and further assuming an interrupting read operation request REQ_r is received from the host 200, the memory controller 100 may issue a suspend command CMD_sp to the memory device 300. Upon receiving the suspend command CMD_sp, the memory device 300 may execute a suspend operation according to an appropriately selected mode (e.g., the cancel mode or on-going mode). If the cancel mode is selected, the interrupting read operation is immediately executed after suspending the execution of the P/E operation, regardless of the completion status of the P/E operation. In contrast, if the ongoing-mode is selected, the interrupting read operation is executed after completion of the P/E operation, but before a next operation is begun.

At this point it should be noted that the examples of a cancel mode and an ongoing mode are merely exemplary. There are a variety of different suspend mode that may be used, and certain embodiments of the inventive concept may utilize more than two modes when executing a suspend operation.

Mode selection for a requested suspend operation may be controlled by the memory controller 100. In one approach to mode selection, the memory controller 100 may communicate a suspend mode change command CMD_md to the memory device 300. That is, the memory controller 100 may communicate the suspend mode change command CMD_md in response to various request(s) REQ received from the host 200 in order to suspend operation of the memory device 300. In certain embodiments, the memory device 300 may execute a requested suspend operation according to a default (or previously set) mode (e.g., a first mode, such as the cancel mode) in the absence of a different indication by the suspend mode change command CMD_md received from the memory controller 100. Alternately, each provision of the suspend mode change command CMD_md by the memory controller 100 may include a particular mode designation for the execution of the suspend operation.

Once the suspend operation is complete (e.g., after the interrupting read operation has been completed and the requested read data returned to the host 200), the memory controller 100 may provide a resume command CMD_rs to the memory device 300. In response to the resume command CMD_rs, the memory device 300 may resume execution of the suspended P/E operation.

In certain embodiments of the inventive concept like the one illustrated in FIG. 1, the suspend operation manager 130 may be used to manage the execution of suspend operations by the memory system 10. For example, the suspend operation manager 130 may control the definition of and transmission of the suspend mode change command CMD_md and/or the resume command CMD_rs. That is, the suspend operation manager 130 may generate suspend mode change information (e.g., info_md of FIGS. 3A and 3B) based on suspend information associated with a requested suspend operation to be performed by the memory device 300, where a particular suspend mode change command CMD_md may be defined by the suspend mode change information generated by the suspend operation manager 130. The suspend operation manager 130 may also be used to manage multiple or successive suspend requests (e.g., a "request set") received from the host 200.

The suspend operation manager 130 may be variously implemented in hardware (e.g., electrical circuitry), firmware and/or software (e.g., program(s) stored in the memory controller 100). In embodiments implementing the suspend operation manager 130, wholly or in part, in software, the suspend operation manager 130 may be implemented as a portion of or in conjunction with a flash translation layer (FTL) executed by a processor (e.g., 120 of FIG. 2).

With the embodiment illustrated in FIG. 1 in mind and assuming a suspend operation executed according to the cancel mode, the memory device 300 may quickly output read data DTA to the memory controller 100 in response to a read request REQ_r, thereby maintaining a high read quality of service (QoS) for the memory system 10. However, when the memory device 300 repeatedly performs a suspend operation in the cancel mode, the reliability of a memory cell(s) (e.g., MC of FIG. 11A) may be reduced over time due to P/E operations being executed, at least in part, and then cancelled. In contrast, when the memory device 300 repeatedly performs a suspend operation in the on-going mode, the overall reliability of memory cell(s) is less reduced because P/E operations are completed. However, the overall operating speed of the memory device 300 is reduced when a large number of suspend operations are executed using the on-going mode, as compared with executing the suspend operations using the cancel mode.

In view of the foregoing, certain embodiments of the inventive concept provide a memory controller capable of executing suspend operations in conjunction with one or more memory devices, such that an improved read QoS, more reliable memory system performance, and sufficiently fast data transmission speeds may be realized. This outcome may be achieved by dynamically defining an operative modality for the suspend operation using a suspend mode change command CMD_md generated by the memory controller, where the definition of the suspend mode change command CMD_md may be made in view of a received request set and/or appropriate suspend mode change information.

Referring again to FIG. 1, the host 200 may exchange data with the memory controller 100 using one or more interface protocols, such as the universal serial bus (USB) protocol, multi-media card (MMC) protocol, peripheral component interconnection (PCI) protocol, PCI-express (PCI-E) protocol, advanced technology attachment (ATA) protocol, serial-ATA protocol, parallel ATA protocol, small computer small interface (SCSI) protocol, enhanced small disk interface (EDSI) protocol, integrated drive electronics (IDE) protocol, mobile industry processor interface (MIPI) protocol, universal flash storage (UFS) protocol, etc.

The memory device 300 may include one or more types of nonvolatile memory, such as flash memory, magnetic RAM (MRAM), ferroelectric RAM (FeRAM), phase change RAM (PRAM), or resistive RAM (ReRAM). Alternatively or additionally, the memory device 300 may include one or more types of volatile memory, such as dynamic RAM (DRAM) including double data rate synchronous DRAM (DDR SDRAM), low power DDR SDRAM (LPDDR SDRAM), graphics DDR SDRAM (GDDR SDRAM), Rambus DRAM (RDRAM), etc. Hereinafter, the memory device 300 will be described as a nonvolatile memory device for convenience of description.

Figure 2:
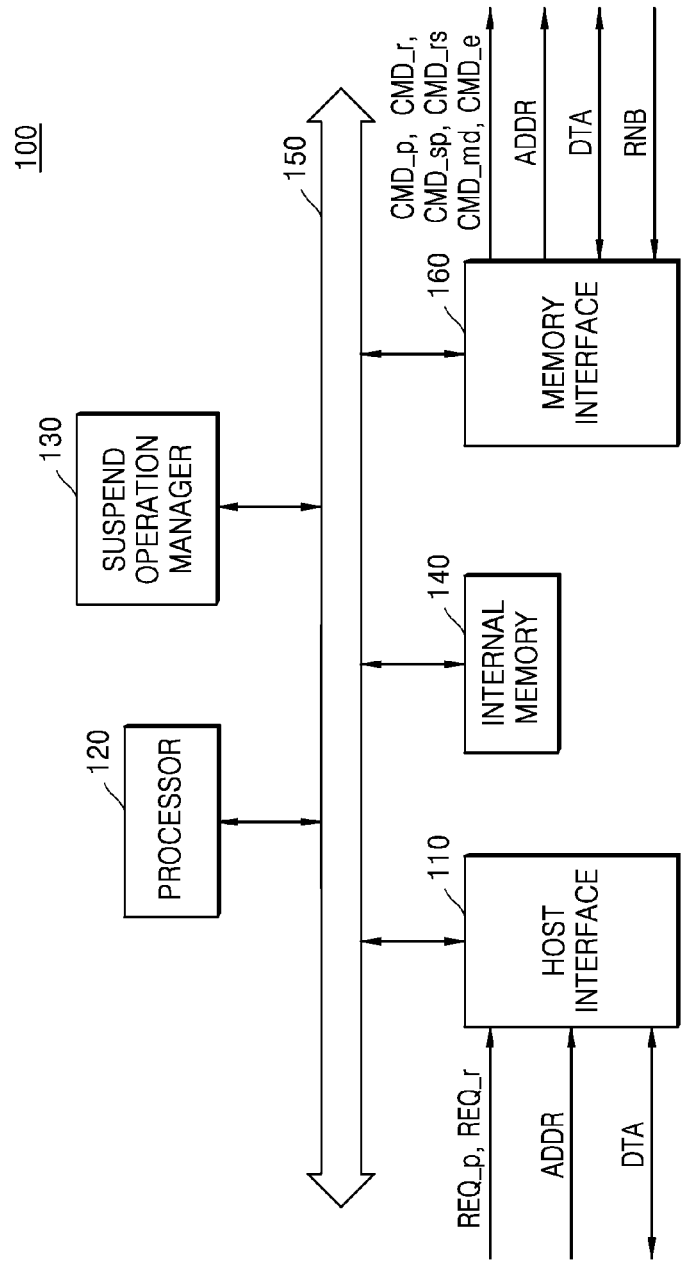
FIG. 2 is a block diagram further illustrating in one embodiment the memory controller 100 of FIG. 1 according to an embodiment of the inventive concept.

FIG. 2 is a block diagram further illustrating in one example the memory controller 100 of FIG. 1 according to embodiments of the inventive concept.

Referring to FIGS. 1 and 2, the memory controller 100 comprises a host interface 110, a processor 120, the suspend operation manager 130, an internal memory 140, a bus 150, and a memory interface 160. Those skilled in the art will appreciate that the memory controller 100 may further include various components, such as a command generation module configurable to generate various command(s) CMD used to control the operation of the memory device 300.

The host interface 110 provides an interface between the memory controller 100 and the host 200. The memory controller 100 and host 200 may variously exchange data DTA, address(es) ADDR, command(s) CMD and/or requests(s) REQ_ via one or more interface(s) using one or more interface protocols.

The processor 120 may be used to control the overall operation of the memory controller 100. The processor 120 may include a central processing unit (CPU), a control logic unit and/or a microprocessor unit. In certain embodiments, the processor 120 may drive firmware controlling the memory controller 100, where the firmware may be loaded to the internal memory 140.

The processor 120 may include a plurality of CPUs or a plurality of cores. For example, the processor 120 may include at least one host core (HCore) and at least one FTL core (FCore), where the HCore may receive a request set from the host interface 110. In addition, the HCore may parse the request set and distribute respective request(s) REQ to a corresponding FCore. The FCore may than be used to control the execution of a read, program, or erase operation by the memory device 300, responsive to received request(s) REQ. The memory controller 100 may output one or more command(s) CMD associated with an operation performed under the control of the FCore. For example, the memory controller 100 may output a read command CMD_r in response to a read operation performed by the FCore.

The suspend operation manager 130 may be used to generate data and signal(s) controlling the execution of a suspend operation by the memory device 300. In this regard, the suspend operation manager 130 may determine suspend information used to define (or change) the mode of the suspend operation. This determination may be made in view of request(s) REQ received from the host 200 and operating state information associated with the memory device 300. For example, as noted above, the memory controller 100 may variously communicate a suspend mode change command CMD_md, a suspend command CMD_sp, and/or a resume command CMD_rs to the memory device 300 in response to the suspend information. Example embodiments of the suspend operation manager 130 will be described hereafter in some additional detail.

The internal memory 140 may be used to store various kinds of data associated with the overall operation of the memory controller 100. The internal memory 140 may be implemented using high-speed, volatile memory, such as DRAM or static RAM (SRAM).

The bus 150 may be used as a signal(s) communication channel between the foregoing components of the memory controller 100. As will be appreciated by those skilled in the art, the bus 150 may be variously configured and operated according to one or more bus protocols.

Figure 3A:
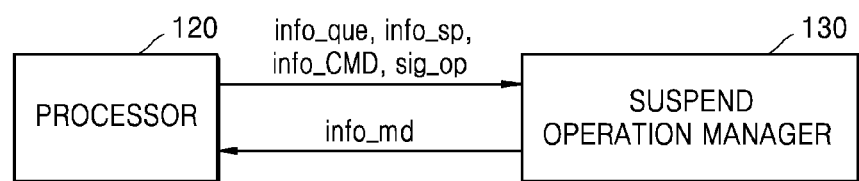
FIGS. 3A and 3B are block diagrams further illustrating the suspend operation manager 130 of FIGS. 1 and 2 according to embodiments of the inventive concept.
Figure 3B:
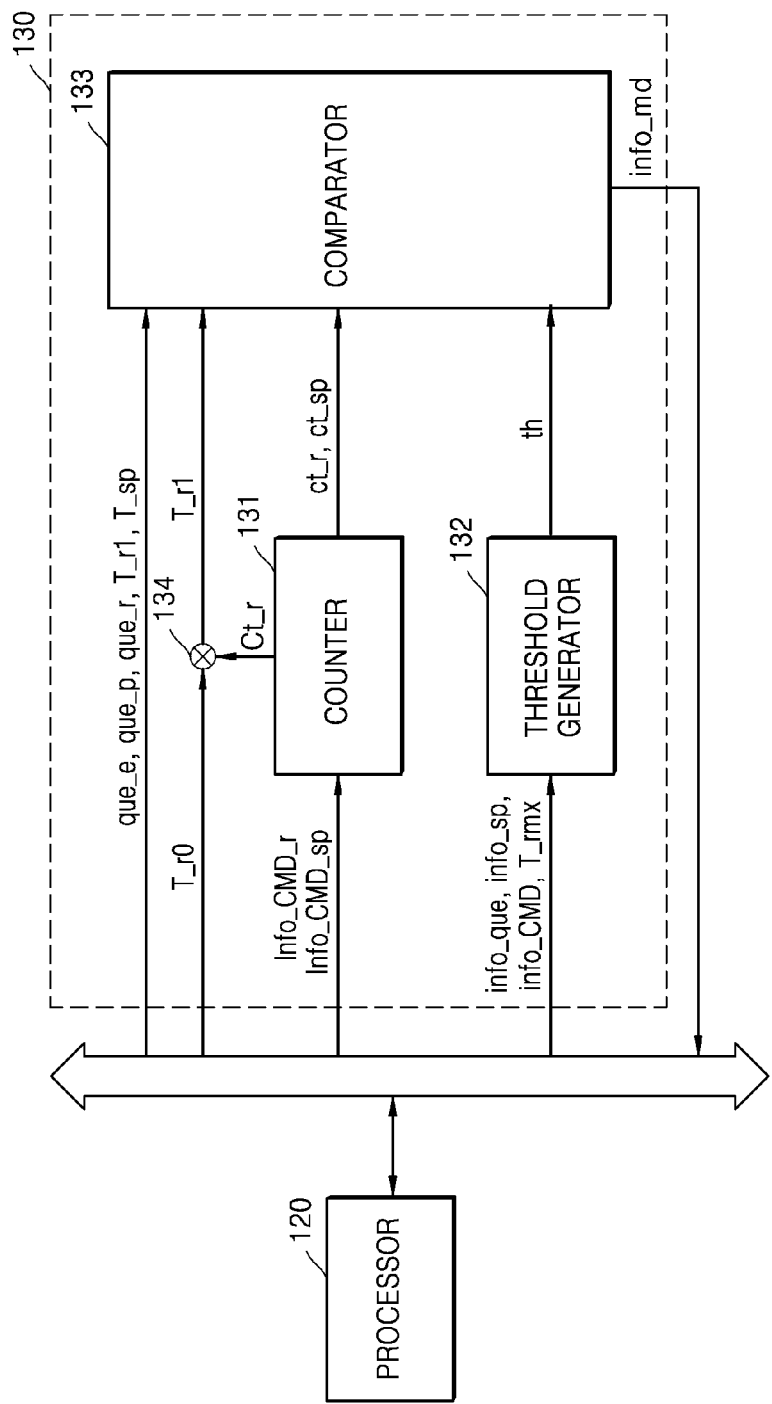

FIGS. 3A and 3B are respective block diagrams further illustrating exemplary operating relationships between the processor 120 and suspend operation manager 130 according to embodiments of the inventive concept.

Referring to FIG. 3A, the processor 120 may communicate (i.e., transmit) queue information info_que, suspend information info_sp, command information info_CMD, and/or an operation control signal sig_op to the suspend operation manager 130. In response, the suspend operation manager 130 may communicate suspend mode change information info_md to the processor 120 based on at least one of the received queue information info_que, suspend information info_sp, command information info_CMD, or operation control signal sig_op.

Referring to FIGS. 1, 3A, and 3B, the queue information info_que may be used to indicate a queuing of request(s) REQ received by the processor from the host 200. Various command(s) CMD may be generated by the processor 120 and/or suspend operation manager 130 in response to the queued request(s) and provided to the memory device 300. In this regard, the queue information info_que may include, wholly or in part, a request set. That is, the queued request(s) may correspond to the request set. Hence, the queue information info_que may define or indicate a number of queued requests, a processing order for the requests, a priority among the various requests, and/or the nature of various operations to be performed by the memory device 300 (e.g., the nature of data operation, such as read, program, and erase operations) in response to the request(s). The definition of data operations may include read/program data and/or address(es) associated with the read/program/erase operation(s). Thus, depending on the nature of the queued requests, the queue information info_que may include (1) queued erase request related information que_e; (2) queued program request related information que_p; and (3) queued read request related information que_r.

The suspend information info_sp may be used to determine (or calculate) the nature and timing of a suspend operation to be performed by the memory device 300. Here, the suspend operation manager 130 may receive suspend information info_sp from the processor 120 and/or the memory device 300 via the memory interface 160. See, e.g., FIG. 2. The suspend information info_sp may include: an address ADDR associated with the suspend operation; a read time T_r; and a suspend maintenance time T_sp allocated in relation to a suspend operation, as well as a maximum read operation time T_rmx allocated to the memory device 300 during which a P/E operation may be suspended. (In this context, it is assumed for purposes of explanation that the memory device 300 performs a read operation in response to a read request REQ_r after suspending a P/E operation).

The command information info_CMD may define or indicate various kinds of commands CMD to be communicated from the memory controller 100 to the memory device 300 in response to the queued request(s).

With the foregoing in mind, when the memory controller 100 communicates an appropriate command CMD, the suspend operation manager 130 may receive command information info_CMD. That is, when the memory controller 100 communicates a read command CMD_r to the memory device 300 'x' times, the suspend operation manager 130 may receive read command related information info_CMD_r x times, or when the memory controller 100 communicates a suspend command CMD_sp to the memory device 300 'y' times, the suspend operation manager 130 may receive suspend command related information info_CMD_sp y times.

Accordingly, the processor 120 may communicate command information info_CMD to the suspend operation manager 130, the command information info_CMD including information regarding a number of transmissions for each command CMD. That is, the suspend operation manager 130 may identify the number of communicated read command(s) CMD_r, program command(s) CMD_p, erase command(s) CMD_e, suspend command(s) CMD_sp, and/or resume command(s) CMD_rs based on the command information info_CMD.

The operation control signal sig_op may serve as an enable signal for the suspend operation manager 130, such that the suspend operation manager 130 outputs suspend mode change information info_md. For example, when the processor 120 may determine that the memory device 300 is currently performing a P/E operation upon receiving a read request REQ_r from the host 200. Accordingly, the processor 120 may communicate an operation control signal sig_op to the suspend operation manager 130, whereupon the suspend operation manager 130 may determine whether or not to change the mode of the suspend operation to be performed by the memory device 300 in response to the operation control signal sig_op, and provide corresponding suspend mode change information info_md.

Referring to one embodiment of the inventive concept illustrated in FIG. 3B, the suspend operation manager 130 may include a counter 131, a threshold generator 132, and a comparator 133.

The threshold generator 132 may be used to provide a threshold 'th' based on the queue information info_que, suspend information info_sp, and/or command information info_CMD. For example, the threshold th may be based on performance data characterizing the read QoS and write starvation of the memory device 300, as well as the reliability of memory cell(s) in the memory device 300.

The comparator 133 may be used to provide suspend mode change information info_md generated by comparing the threshold th with a value calculated from at least one of the queue information info_que and suspend information info_sp. For example, the comparator 133 may provide suspend mode change information info_md indicating the cancel mode when the calculated value is less than the threshold th, or suspend mode change information info_md indicating the on-going mode when the calculated value is greater than or equal to the threshold th.

In certain embodiments of the inventive concept, the comparator 133 may be used to determine the suspend mode by comparing a value calculated based on the suspend information info_sp with the threshold th. For example, the comparator 133 may determine the suspend mode by comparing the threshold th with a read time T_r for a read operation to be performed by the memory device 300 during the suspend operation. Here, the threshold th may be the maximum read operation time T_rmx allocated to the memory device 300 during a suspend operation. That is, the read time T_r for a read operation may be a time T_r1 for a total read operation performed during a suspend operation. In this case, the comparator 133 may output suspend mode change information info_md indicating the cancel mode, or the on-going mode by comparing the time T_r1 with the maximum read operation time T_rmx.

As other embodiments of the inventive concept, the suspend operation manager 130 may further include a multiplier 134, where the multiplier 134 may be used to provide the time T_r1 required for a total read operation to be performed during a suspend operation. Here, the multiplier 134 may multiply a number of times 'ct_r' that the memory controller 100 has communicated a read command CMD_r by a time period T_r0 required for a read operation to be performed by the memory device 300 in response to each read command CMD_r. The multiplier 134 may then provide the time T_r1 as a defining characteristic of the memory system performance, and the comparator 133 may output suspend mode change information info_md indicating (e.g.,) either the cancel mode or the on-going mode according to this calculated (i.e., compared) characteristic.

As another embodiment of the inventive concept, the comparator 133 may acquire a number of requests REQ included in each queue, based on the queued erase request related information que_e, the queued program request related information que_p, and the queued read request related information que_r. For example, the comparator 133 may output suspend mode change information info_md indicating the on-going mode when a ratio of read requests to program requests and erase requests included in a queue is greater than a threshold. As another example, the comparator 133 may output suspend mode change information info_md indicating the on-going mode when a ratio of the number of read requests to the number of requests REQ occupied in a queue is greater than a threshold.

As still another embodiment of the inventive concept, the comparator 133 may output suspend mode change information info_md indicating the on-going mode when a number of suspend command communications ct_sp is greater than or equal to the threshold th. In this case, the counter 131 may output the number of suspend command communications ct_sp based on the suspend command related information info_CMD_sp. Herein, the number of suspend command communications ct_sp may be the same as the number of suspend commands CMD_sp communicated to the memory device 300.

As still another embodiment of the inventive concept, the comparator 133 may provide suspend mode change information info_md indicating the on-going mode when a suspend maintenance time T_sp for performing a suspend operation is greater than or equal to a threshold.

In view of the foregoing, the memory controller 100 may, or may not, be required to communicate a suspend command CMD_sp based on suspend mode change information info_md. For example, assuming that the cancel mode is set as a default mode for the suspend operation performed by the memory device 300, the memory controller 100 need not communicate a suspend mode change command CMD_md under conditions where the default mode option is valid. Assuming again the use of only two modes for the suspend operation (e.g., cancel and on-going), the memory controller 100 may only be required to communicate a suspend command CMD_sp and/or a suspend mode change command CMD_md when performance conditions warrant the execution of the suspend operation in the on-going mode. In this regard, the processor 120 may control the memory controller 100 such that the memory controller 100 provides at least one of a suspend command CMD_sp and a suspend mode change command CMD_md in response to the suspend mode change information info_md.

Figure 4:
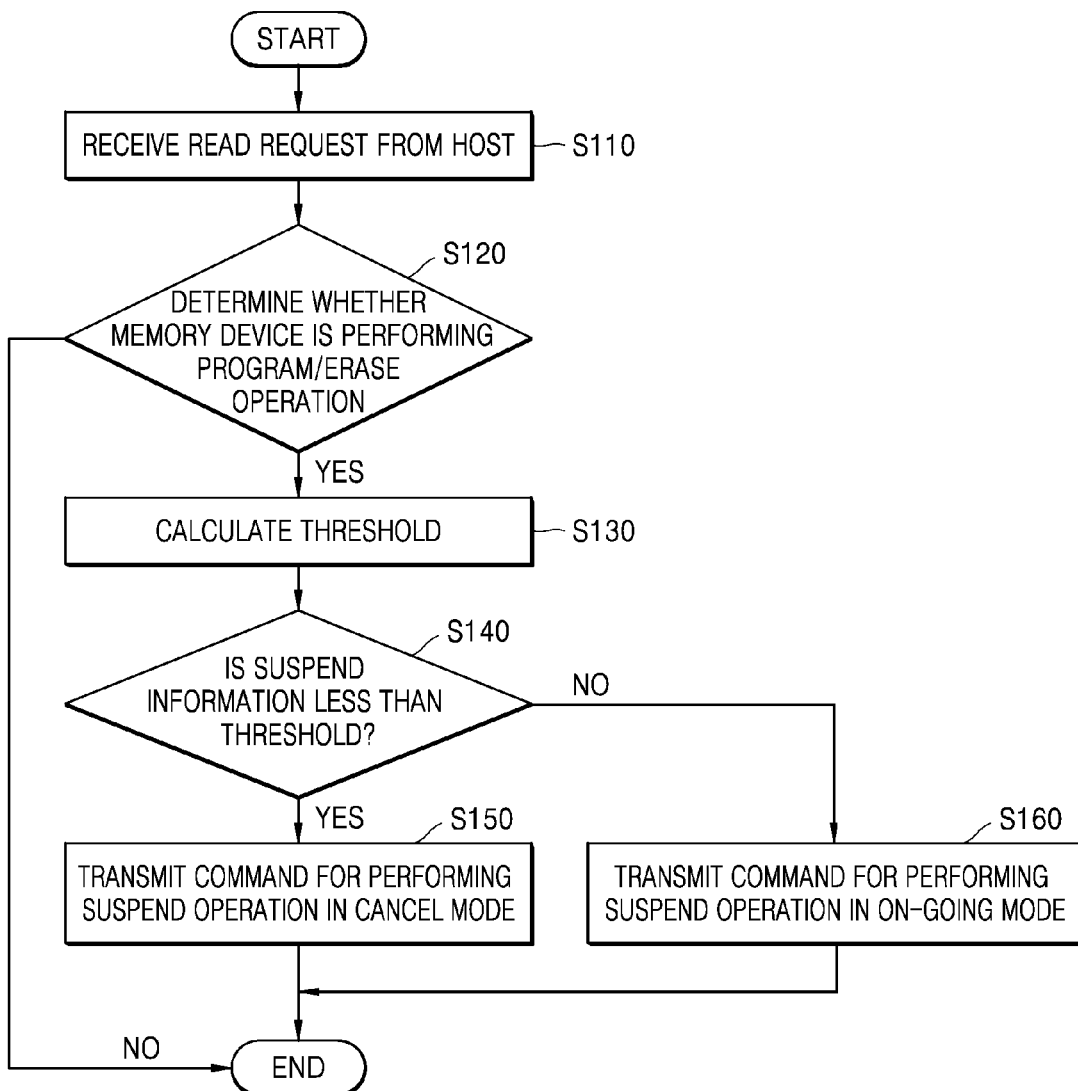
FIG. 4 is a flowchart summarizing a control method for a memory device according to an embodiment of the inventive concept.

FIG. 4 is a flowchart summarizing a control method for the memory device 300 of the memory system 10 of FIG. 1 according to an embodiment of the inventive concept.

Here, the memory controller 100 may receive a read request REQ_r from the host 200 (S110), and the memory controller 100 may determine whether the memory device 300 is currently performing a P/E operation (S120). For example, the memory controller 100 may determine whether the memory device 300 is currently performing a P/E operation upon communicating a program command CMD_p or an erase command CMD_e to the memory device 300, or upon receiving a program request REQ_p or an erase request REQ_e from the host 200. When it is determined that the memory device 300 is currently performing a P/E operation, the memory controller 100 will communicate a mode-appropriate suspend command to the memory device 300.

To do this, the memory controller 100 may calculate a threshold th for determining the suspend mode (S130). As noted above, the threshold th may a value used to determine the suspend mode which ensures both a high read QoS and continued reliability of the constituent memory cells. One approach to the calculation of the threshold th has been described above with reference to FIG. 3B.

Once the threshold th has been calculated, the memory controller 100 receives suspend information info_sp, and compares the received suspend information info_sp with the threshold th (S140). As noted above, the suspend information info_sp and the threshold th may be related information (e.g., related time values). In certain embodiments of the inventive concept, the suspend information info_sp may include a read time T_r required for execution of a read operation during the suspend operation, and the threshold th may be a maximum read operation time T_rmx allocated to the execution of the suspend operation. Alternately, the suspend information info_sp and threshold th may be values determined by counting a number of requests (e.g., read requests) or a number of communicated commands (e.g., read, program and/or erase commands).

Upon determining that the suspend information info_sp is less than the threshold th (S140=YES), the memory controller 100 may communicate a command CMD to the memory device 300 so that the memory device 300 performs the suspend operation in the cancel mode (S150). Otherwise, upon determining that the suspend information info_sp is not less than the threshold th (S140=NO), the memory controller 100 may communicate a command CMD to the memory device 300 so that the memory device 300 performs the suspend operation in the on-going mode.

According to certain embodiments of the inventive concept, after communicating a command CMD for performing the suspend operation in the on-going mode, another command CMD may be communicated to restore the default mode for the suspend operation to (e.g.,) the cancel mode.

Figure 5A:
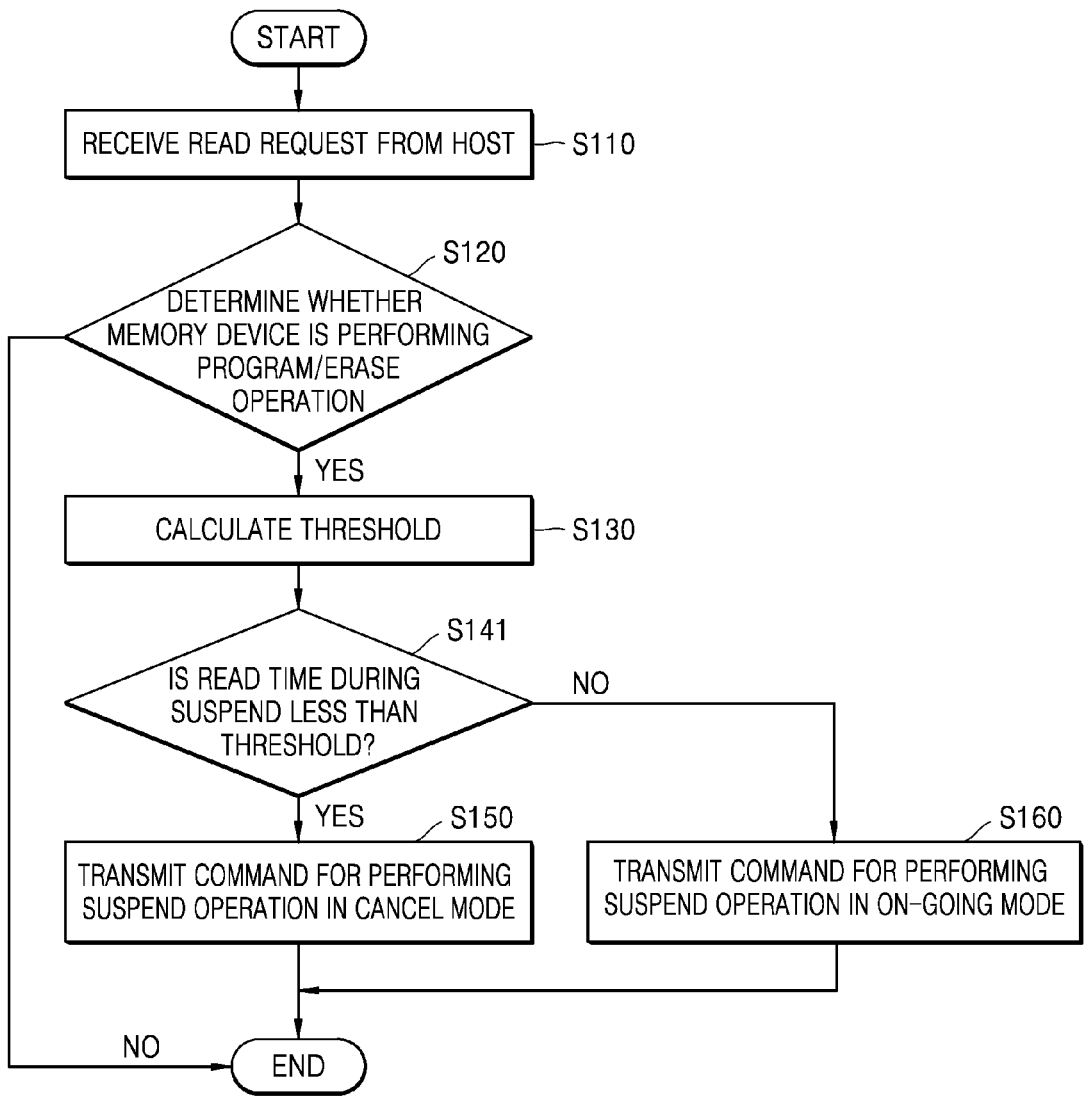
FIG. 5A is a flowchart summarizing a control method for a memory device according to an embodiment of the inventive concept.

FIG. 5A is another flowchart summarizing a control method for the memory device 300 according to an embodiment of the inventive concept. Only the method step S141, instead of method step S140 described above, is different in the method of FIG. 5A, as compared with the method of FIG. 4.

Referring to FIG. 5A, when the read time T_r required for a read operation to be executed during the suspend operation is less than the threshold th, the memory controller 100 may communicate a command CMD to the memory device 300 so that the memory device 300 performs the suspend operation using the cancel mode.

As noted above, read QoS may be higher in the cancel mode than in the on-going mode, but the reliability of the constituent memory cell(s) may be higher in the on-going mode than in the cancel mode. Thus, when the read time T_r is relatively short, the corresponding number of cancel mode suspend operations being performed may also be small, and there is no large burden placed upon the memory cell reliability. Under these conditions, a high read QoS should be maintained, and the memory controller 100 should control the operation of the memory device 300 such that suspend operations are executed using the cancel mode (S150).

However, when the read time T_r is not less than the threshold th, the memory controller 100 communicates a command CMD to the memory device 300 such that the memory device 300 performs the suspend operation using the on-going mode (S160). Here again, the command CMD may include a suspend command CMD_sp and a suspend mode change command CMD_md. Thus, when the read time T_r is relatively long, the corresponding number of cancel mode suspend operation being performed may be large. Accordingly, assuming that the data operation being performed is a program operation, write starvation may be severe, and the overall speed of data operations by the memory system 10 may be notably reduced. In addition, the reliability of memory cell may be reduced, and thus, when the read time T_r required for a read operation to be executed during a suspend operation is long, the memory controller 100 may control the memory device 300 such that the memory device 300 performs the suspend operation using the on-going mode.

Figure 5B:
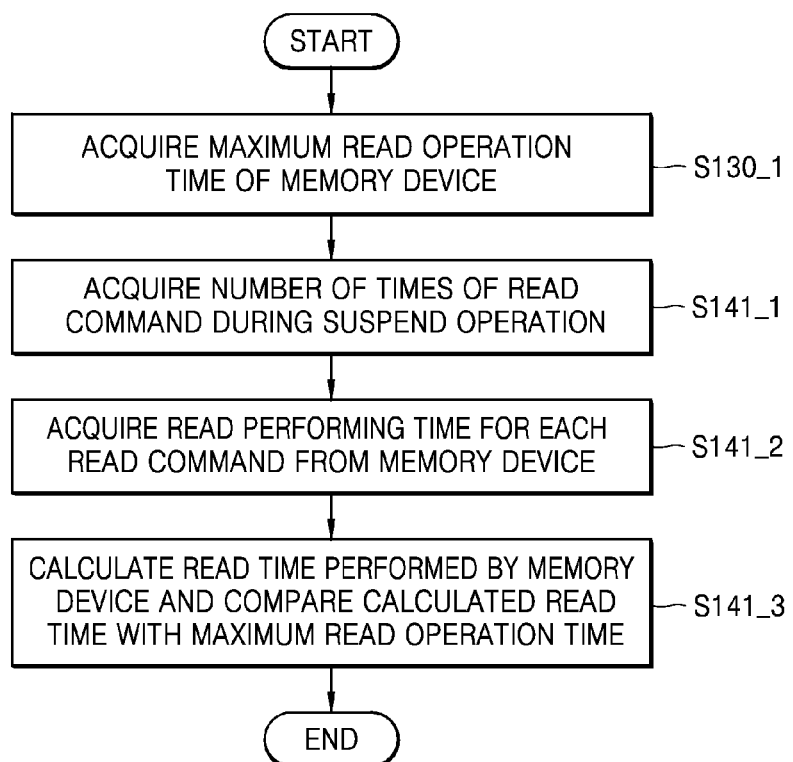
FIG. 5B is a flowchart further summarizing in one example the threshold calculation step and the comparison step of the method of FIG. 5A according to an embodiment of the inventive concept.

FIG. 5B is another flowchart further illustrating in one example an approach to the calculation of the threshold th (S130) and the determination (e.g., comparison) of the threshold th with the suspend information (S140) in the methods of FIGS. 4 and 5A according to embodiments of the inventive concept.

Referring to FIG. 5B, the memory controller 100 may acquire a maximum read operation time T_rmx for the memory device 300 (S130_1). The maximum read operation time T_rmx may be included in the threshold th. For example, the memory controller 100 may receive information about the maximum read operation time T_rmx from the memory device 300 and acquire the maximum read operation time T_rmx based on the received information.

The maximum read operation time T_rmx may be a maximum time for which the memory device 300 can perform a read operation while suspending a program operation or an erase operation. Because the memory device 300 has to perform a resume operation after a suspend operation, the program operation or the erase operation cannot be infinitely suspended. Therefore, the memory device 300 may perform a read operation according to a read request REQ_r only for a preset time.

The memory controller 100 may acquire the number of transmissions of a read command CMD_r during a suspend operation (S141_1). For example, the memory controller 100 may indicate a time for which the memory device 300 performs a suspend operation, based on program commands CMD_p and erase commands CMD_e communicated to the memory device 300. The memory controller 100 may acquire the number of read commands CMD_r which the memory controller 100 has communicated for the time for which the memory device 300 has performed the suspend operation.

The memory controller 100 may acquire a time for which a read operation for each read command CMD_r has been performed (S141_2). For example, the memory device 300 may communicate various kinds of information about a data operation to the memory controller 100, and the information may include the time for which a read operation for each read command CMD_r has been performed.

The memory controller 100 may calculate a read time performed by the memory device 300 and compare the calculated read time with the maximum read operation time T_rmx (S141_3). In this case, the memory controller 100 may calculate the read time performed by the memory device 300 by multiplying the number of transmissions of a read command CMD_r during a suspend operation, which has been acquired in operation S141_1 by the time for which a read operation for each read command CMD_r has been performed, which has been acquired in operation S141_2.

The memory controller 100 may compare the calculated time with the maximum read operation time T_rmx. When the calculated time is less than the maximum read operation time T_rmx, the memory controller 100 may communicate a command CMD to the memory device 300 such that the memory device 300 performs a suspend operation in the cancel mode. Otherwise, when the calculated time is greater than or equal to the maximum read operation time T_rmx, the memory controller 100 may communicate a command CMD to the memory device 300 such that the memory device 300 performs a suspend operation in the on-going mode.

Figure 6A:
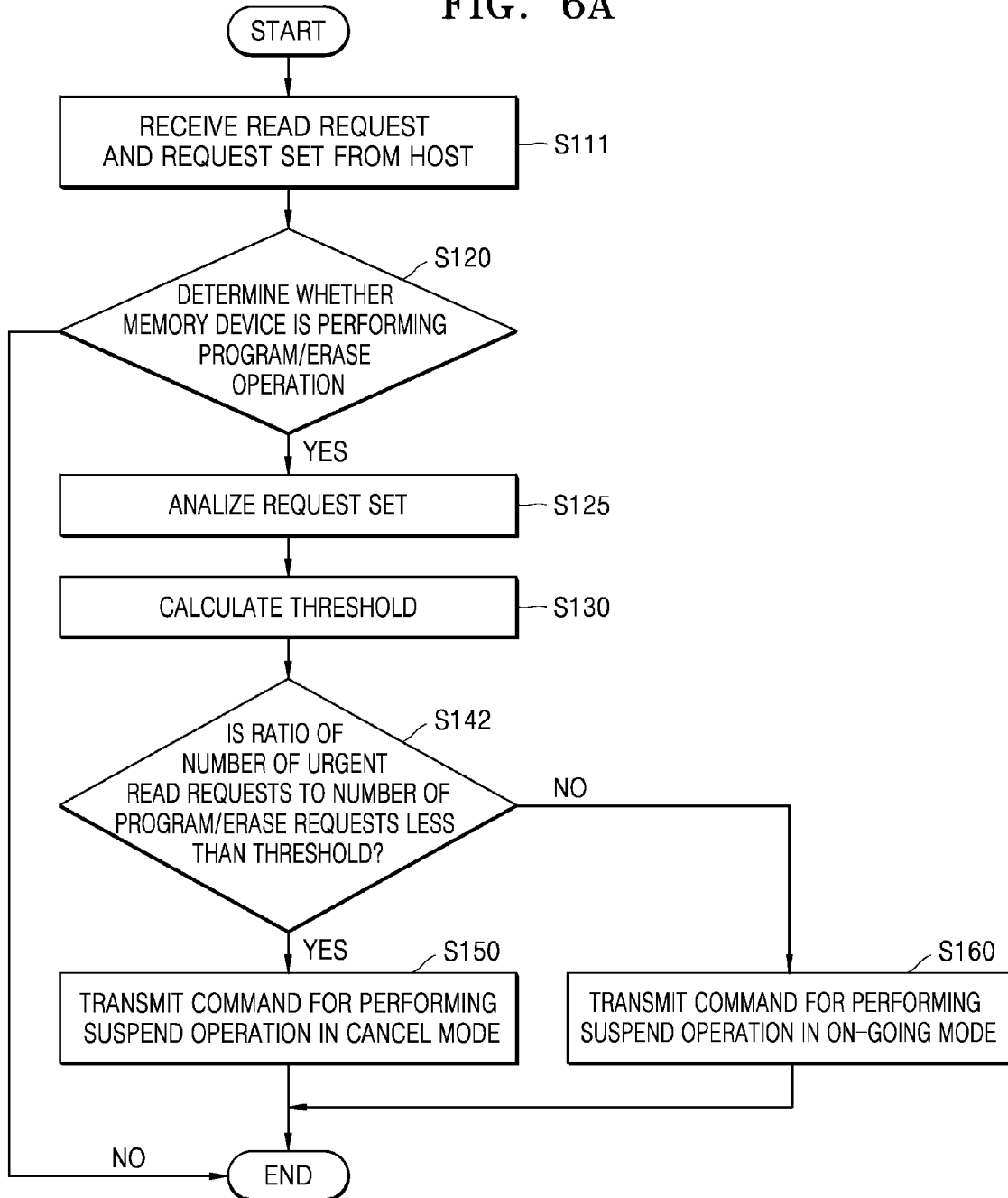
FIG. 6A is a flowchart summarizing a control method for a memory device according to an embodiment of the inventive concept.

FIG. 6A is another flowchart summarizing a control method for the memory device 300 of memory system 10 of FIG. 1 according to an embodiment of the inventive concept.

Here, the memory controller 100 may receive a read request REQ_r and a request set from the host 200 (S111), where the request set may include a plurality of requests REQ.

In response, the memory controller 100 may determine whether the memory device 300 is currently performing a P/E operation (S120). When the memory device 300 is not performing a P/E operation (S120=NO), the memory controller 100 need not issue a command to the memory device 300 to perform a suspend operation.

However, when it is determined that the memory device 300 is currently performing a P/E operation (S120=YES), the memory controller 100 issues a command to the memory device 300 to perform a suspend operation. In order to do this, the memory controller 100 may analyze the received request (S125). Here, the memory controller 100 may receive a request set or queued set of requests from the host 200. The queue may include program request(s) REQ_p, erase request(s) REQ_e, and/or read request(s) REQ_r. In response, the memory controller 100 may sequentially communicate a corresponding set of commands CMD to the memory device 300 according to respective priorities of the queued requests REQ.

The memory controller 100 may then calculate the threshold th (S130). For example, the memory controller 100 may calculate the threshold th based on a total number of queued requests, a number of queues, the speed at which the memory controller 100 processes each read request REQ_r, and/or a numbers of individual units included in the memory device 300 (e.g., a number of chips, memory blocks, planes, pages, etc.).

Then, the memory controller 100 may compare a ratio of the number of urgent (or high priority) received read request(s) REQ_r with the number of received erase request(s) REQ_e and/or program request(s) REQ_p with the threshold th (S142).

The memory controller 100 may control the memory device 300 such that the memory device 300 performs the suspend operation using the cancel mode when the ratio of read request(s) REQ_r to erase request(s) REQ_e and program request(s) REQ_p is less than the threshold th (S150). Otherwise, the memory controller 100 may control the memory device 300 such that the memory device 300 performs a suspend operation in the on-going mode (S160).

Referring to operations S142, S150, and S160 described above, the erase request(s) REQ_e, program request(s) REQ_p, and/or read request(s) REQ_r may occupy the queue which the memory controller 100 receives from the host 200. Herein, when the read request(s) REQ_r occupy a relatively smaller portion of the queue, a small number of read operations will be performed by the memory device 300, and accordingly, the risk of decreasing memory cell reliability is small. Accordingly, the memory device 300 may perform the suspend operation using the cancel mode.

However, when the read request(s) REQ_r occupy a relatively larger portion of the queue, the risk of decreasing memory cell reliability is relatively large, and thus, the memory device 300 may perform the suspend operation using the on-going mode.

Figure 6B:
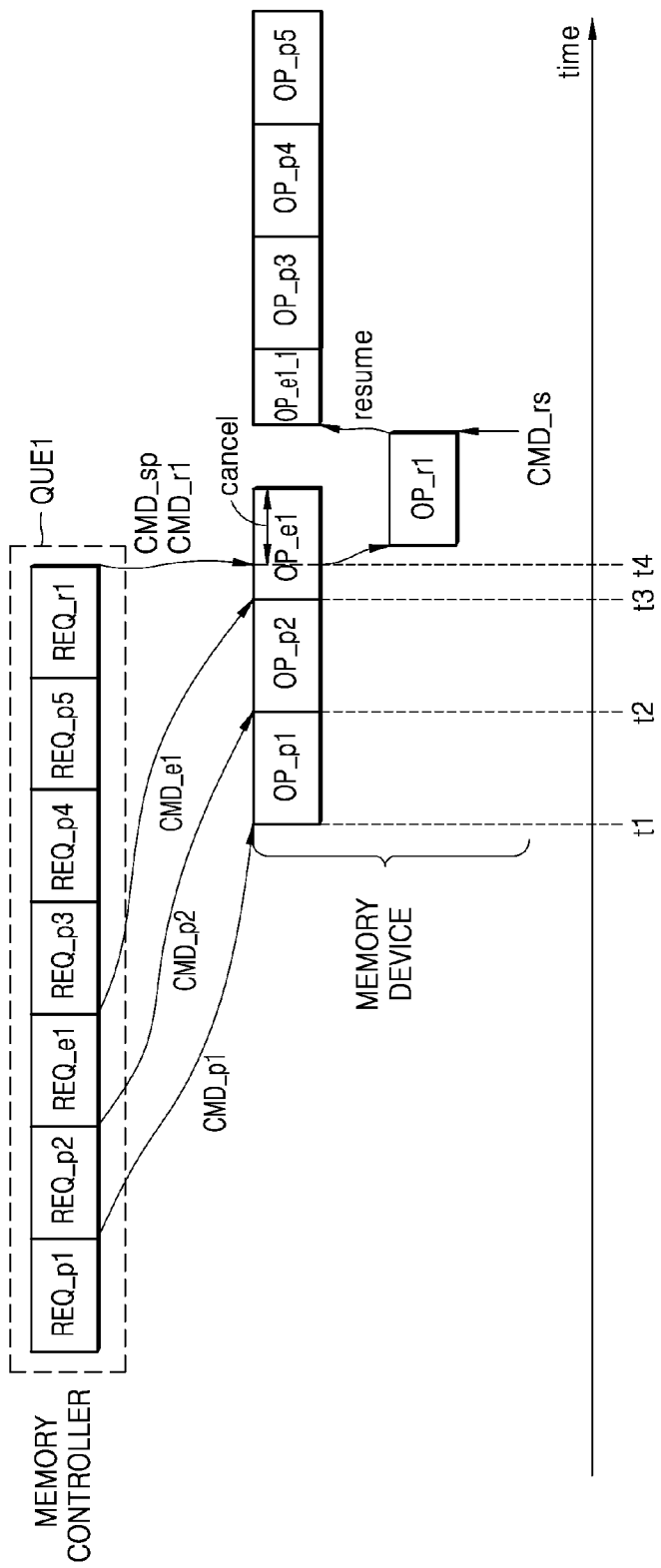
FIGS. 6B and 6C are respective data flow diagrams further illustrating various suspend operations according to embodiments of the inventive concept.

FIG. 6B is a data flowchart further illustrating in one example a suspend operation executed using the cancel mode according to an embodiment of the inventive concept.

Referring to FIG. 6B, a first queue QUE1 may include requests REQ received from the host 200, the requests REQ including a plurality of program requests, e.g., first to fifth program requests REQ_p1 to REQ_p5, a first erase request REQ_e1, and a first read request REQ_r1. The first read request REQ_r1 may have a higher priority than the plurality of program requests REQ_p1 to REQ_p5 and the first erase request REQ_e1.

According to an embodiment of the inventive concept, the memory controller 100 may sequentially receive the first program request REQ_p1, the second program request REQ_p2, the first erase request REQ_e1, the third program request REQ_p3, the fourth program request REQ_p4, and the fifth program request REQ_p5 from the host 200.

According to an embodiment of the inventive concept, the memory controller 100 may communicate a first program command CMD_p1, a second program command CMD_p2, and a first erase command CMD_e1 at a first time t1, a second time t2, and a third time t3, respectively. The memory controller 100 may communicate a suspend command CMD_sp and a first read command CMD_r1 at a fourth time t4 based on the first read request REQ_r1.

According to an embodiment of the inventive concept, the memory device 300 may cancel the entire or a portion of the first erase operation OP_e1 being performed, in response to the received suspend command CMD_sp, and may perform a first read operation OP_r1 in response to the received first read command CMD_r1. When the first read operation OP_r1 is completed, the memory controller 100 may communicate a resume command CMD_rs to the memory device 300. In response to the received resume command CMD_rs, the memory device 300 may resume the entire cancelled first erase operation OP_e1 or the cancelled portion of the first erase operation OP_e1_1.

As another example, the memory device 300 may cancel a first program operation OP_p1 and a second program operation OP_p2 which have been completely performed and cancel the first erase operation OP_e1 being performed, and may performed the first read operation OP_r1 in response to the received first read command CMD_r1. When the first read operation OP_r1 is completed, the memory controller 100 may communicate a resume command CMD_rs to the memory device 300. In response to the received resume command CMD_rs, the memory device 300 may resume the cancelled first program operation OP_p1, second program operation OP_p2, and first erase operation OP_e1.

Figure 6C:
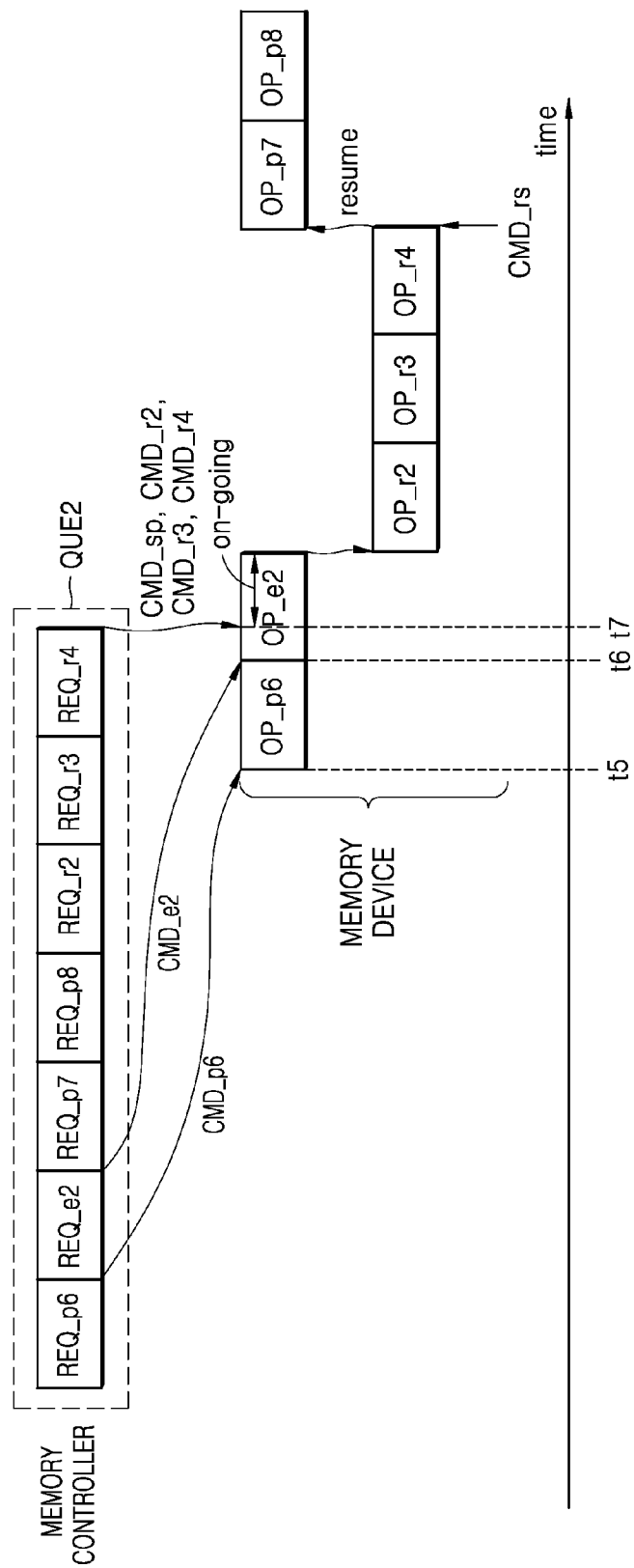

FIG. 6C is a data flowchart further illustrating one example the execution of a suspend operation using an on-going mode according to an embodiment of the inventive concept.

Referring to FIG. 6C in the context of the previously descriptions of FIG. 6B, a second queue QUE2 may include requests REQ received from the host 200, the requests REQ including a plurality of program requests, e.g., sixth to eighth program requests REQ_p6 to REQ_p8, a second erase request REQ_e2, and a plurality of read requests, e.g., second to fourth read requests REQ_r2 to REQ_r4. The plurality of read requests REQ_r2 to REQ_r4 may have higher priorities than the plurality of program requests REQ_p6 to REQ_p8 and the second erase request REQ_e2.

According to an embodiment of the inventive concept, the memory controller 100 may sequentially receive the sixth program request REQ_p6, the second erase request REQ_e2, the seventh program request REQ_p7, and the eighth program request REQ_p8 from the host 200.

According to an embodiment of the inventive concept, the memory controller 100 may communicate a sixth program command CMD_p6 at a time t5. The memory controller 100 may communicate a second erase command CMD_e2 at a time t6. The memory controller 100 may communicate a suspend command CMD_sp and second to fourth read commands CMD_r2 to CMD_r4 at a time t7 based on the second to fourth read requests REQ_r2 to REQ_r4.

According to an embodiment of the inventive concept, in response to the received suspend command CMD_sp, the memory device 300 may perform second to fourth read operations OP_r2 to OP_r4 after a second erase operation being performed is completed. That is, a suspend operation may be performed in an on-going manner instead of a cancel manner. Thereafter, when the fourth read operation OP_r4 is completed, the memory controller 100 may communicate a resume command CMD_rs to the memory device 300. In response to the received resume command CMD_rs, the memory device 300 may perform data operations (e.g., seventh and eighth program operations OP_p7 and OP_p8) according to the remaining requests (e.g., the seventh and eighth program requests REQ_p7 and REQ_p8).

Comparing FIGS. 6B and 6C, the first queue QUE1 has a higher ratio of the number of program requests REQ_p and erase requests REQ_e to the number of read requests REQ_r than the second queue QUE2. When the number of read requests REQ_r is small, the memory controller 100 may control the memory device 300 such that the memory device 300 performs a suspend operation in the cancel mode as shown in FIG. 6B, for the improvement of read QoS. However, when the number of read requests REQ_r is large, the memory controller 100 may control the memory device 300 such that the memory device 300 performs a suspend operation in the on-going mode as shown in FIG. 6C, for the improvement of read QoS of the whole system and the reliability of a memory cell through write starvation reduction.

Figure 7:
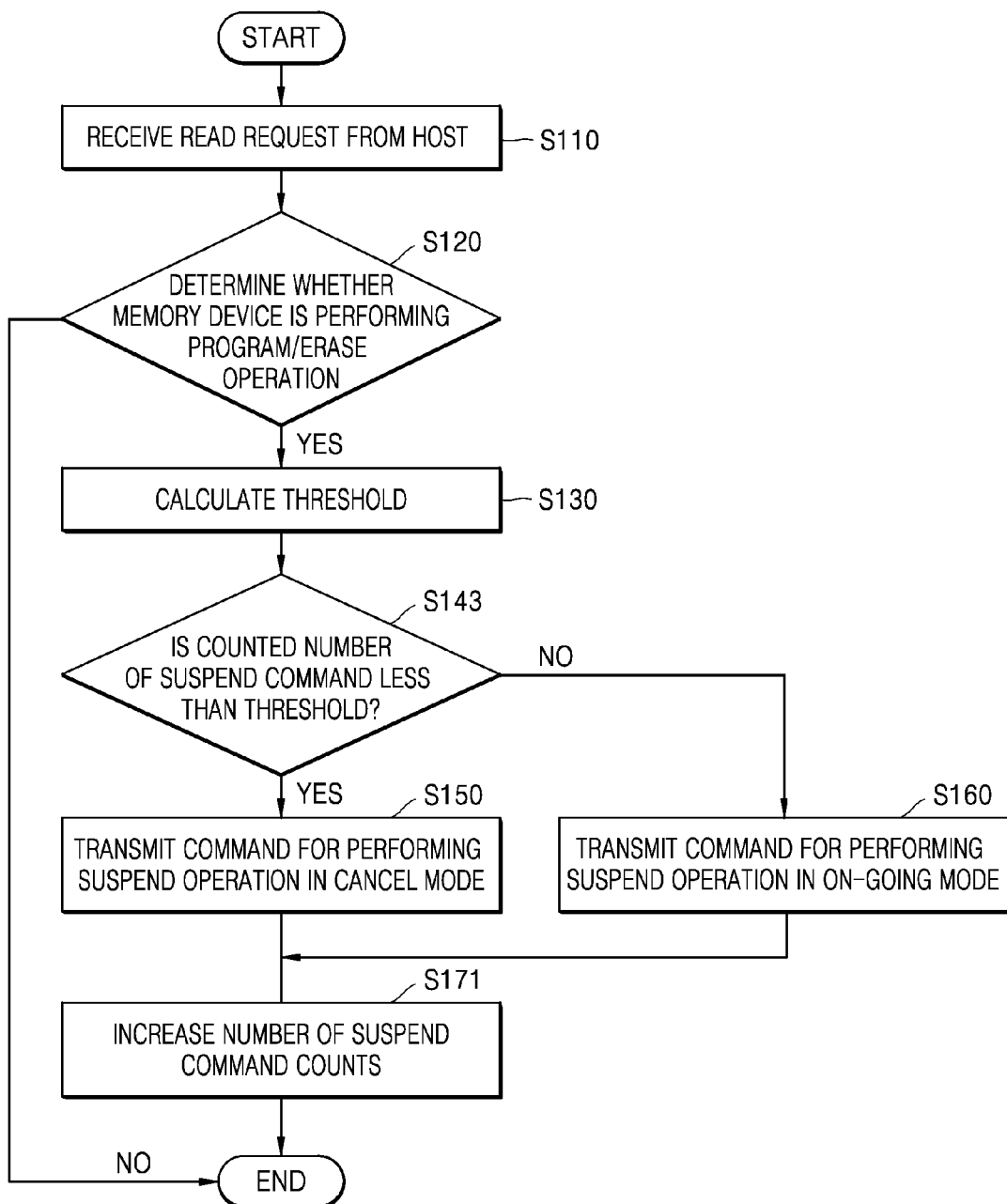
FIGS. 7 and 8 are respective flowcharts summarizing control methods for a memory device according to an embodiment of the inventive concept.
Figure 8:
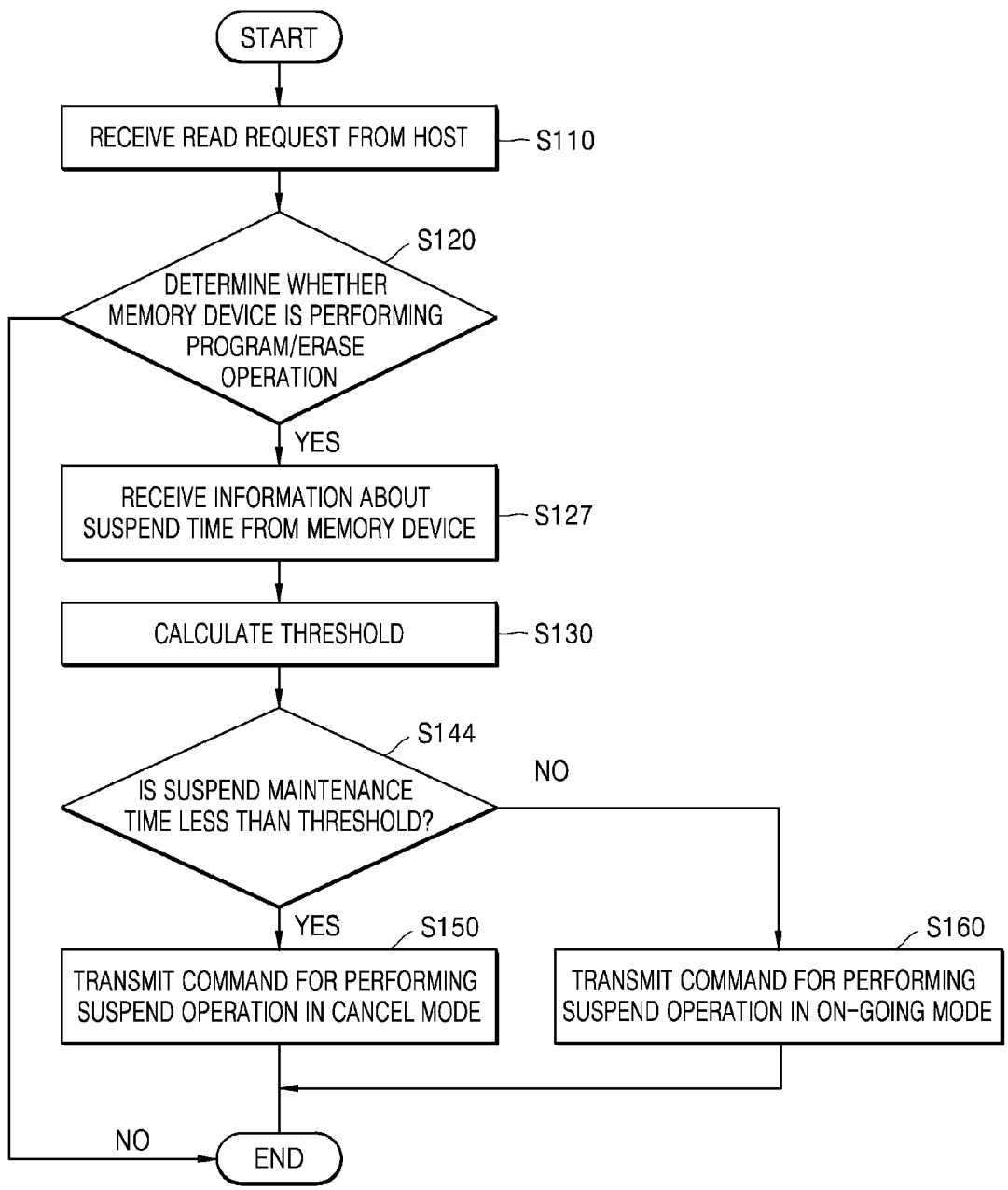

FIGS. 7 and 8 are respective flowcharts summarizing various control methods for the memory device 300 of the memory system 10 of FIG. 1 according to embodiments of the inventive concept. In the description that follows only differences among the various method embodiments with the embodiment described in relation to FIG. 4 will be emphasized.

Referring to FIG. 7, it is assumed that the memory controller has obtained information indicating how many times the memory device 300 has executed suspend operations over a predetermined time period or interval (e.g., a counted number of suspend commands). The memory controller 100 also calculates a threshold th (S130) indicating a maximum number of times that the memory device 300 may appropriately execute suspend operations during the predetermined time period.

A determination is made as whether the counted number of suspend commands CMD_sp is less than the threshold th (S143). If the counted number of suspend operations is less than the threshold th (S143=YES), the memory controller 100 may communicate a command CMD to the memory device 300 such that the memory device 300 performs the suspend operation using the cancel mode (S150). In this case, the command CMD may include a suspend command CMD_sp.

However, if the counted number of suspend operations is not less than the threshold th (S143=NO), the memory controller 100 may communicate a command CMD to the memory device 300 such that the memory device 300 performs the suspend operation using the on-going mode (S160). In this case, the command CMD may include a suspend command CMD_sp and a suspend mode change command CMD_md.

According to embodiments of the inventive concept, the counted number of suspend commands ct_sp may be a value obtained by identifying a number of times that the memory controller 100 has communicated a suspend command CMD_sp, or a value obtained by identifying a number of times that the memory device 300 has received a suspend command CMD_sp.

Then, the memory controller 100 may increase (or increment) the counted number of suspend command counts ct_sp in response to the suspend command CMD_sp being communicated by operation S150 or operation S160. In other words, the memory controller 100 may perform a count-up operation associated with communication of the suspend command CMD_sp.

Referring to FIG. 8, the memory controller 100 may receive information about a suspend maintenance time from the memory device 300 (S127). Here, the information about the suspend time may include the suspend maintenance time T_sp required to perform a suspend operation and a maximum time allocated to the memory device 300 to internally perform a suspend operation.

In this context, the memory controller 100 may calculate the threshold th identifying a maximum time during which the memory device 300 may internally perform the suspend operation (S130).

When the suspend maintenance time T_sp is less than the threshold th (S144=YES), the memory controller 100 may communicate a command CMD to the memory device 300 such that the memory device 300 performs the suspend operation using the cancel mode (S150). In this case, the command CMD may include a suspend command CMD_sp.

However, when the suspend maintenance time T_sp is not less than the threshold th (S144=NO), the memory controller 100 may communicate a command CMD to the memory device 300 such that the memory device 300 performs the suspend operation using the on-going mode. In this case, the command CMD may include a suspend command CMD_sp and a suspend mode change command CMD_md.

Figure 9A:
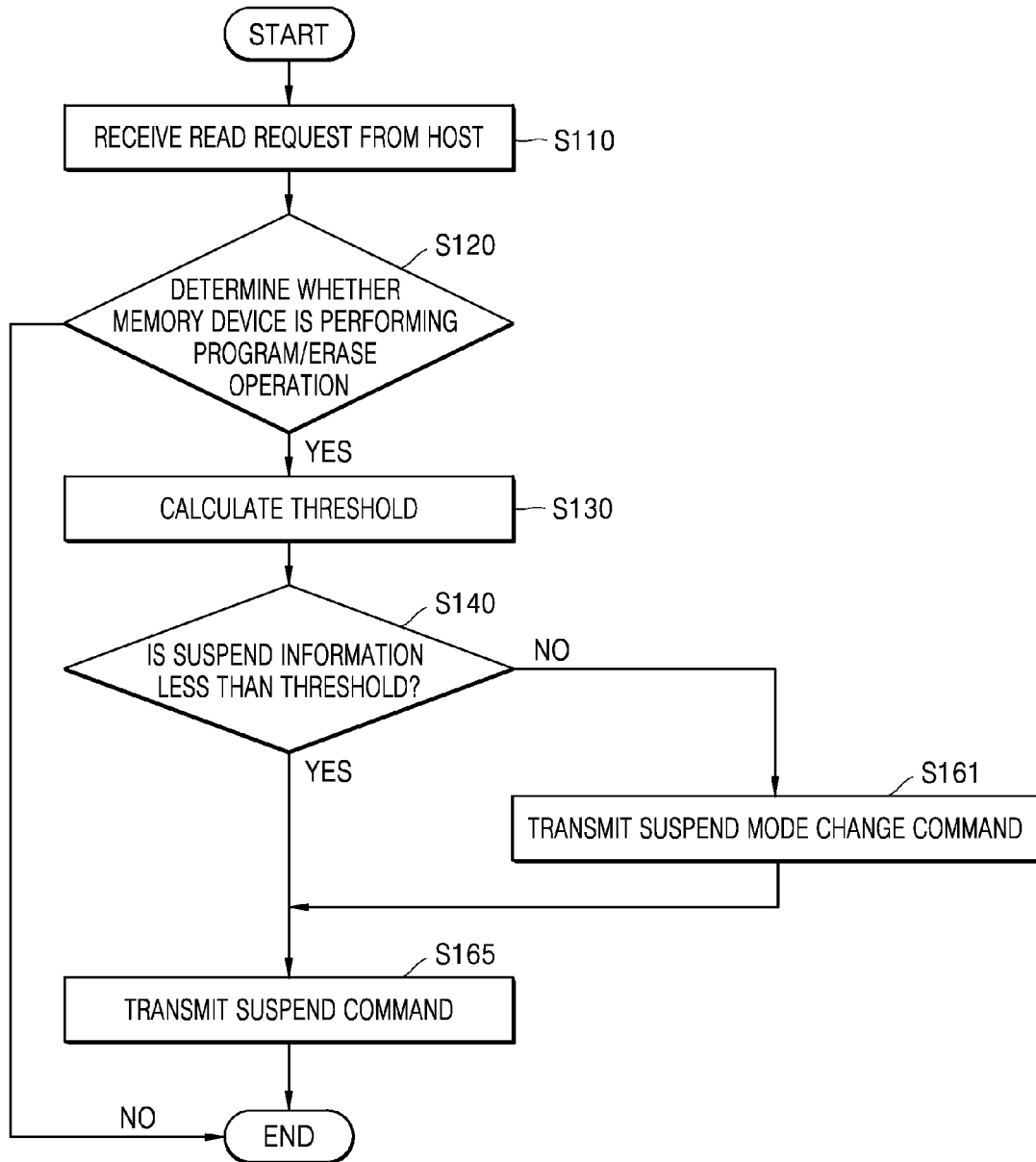
FIG. 9A is a flowchart summarizing a method of communicating a suspend mode change signal according to an embodiment of the inventive concept.
Figure 9B:
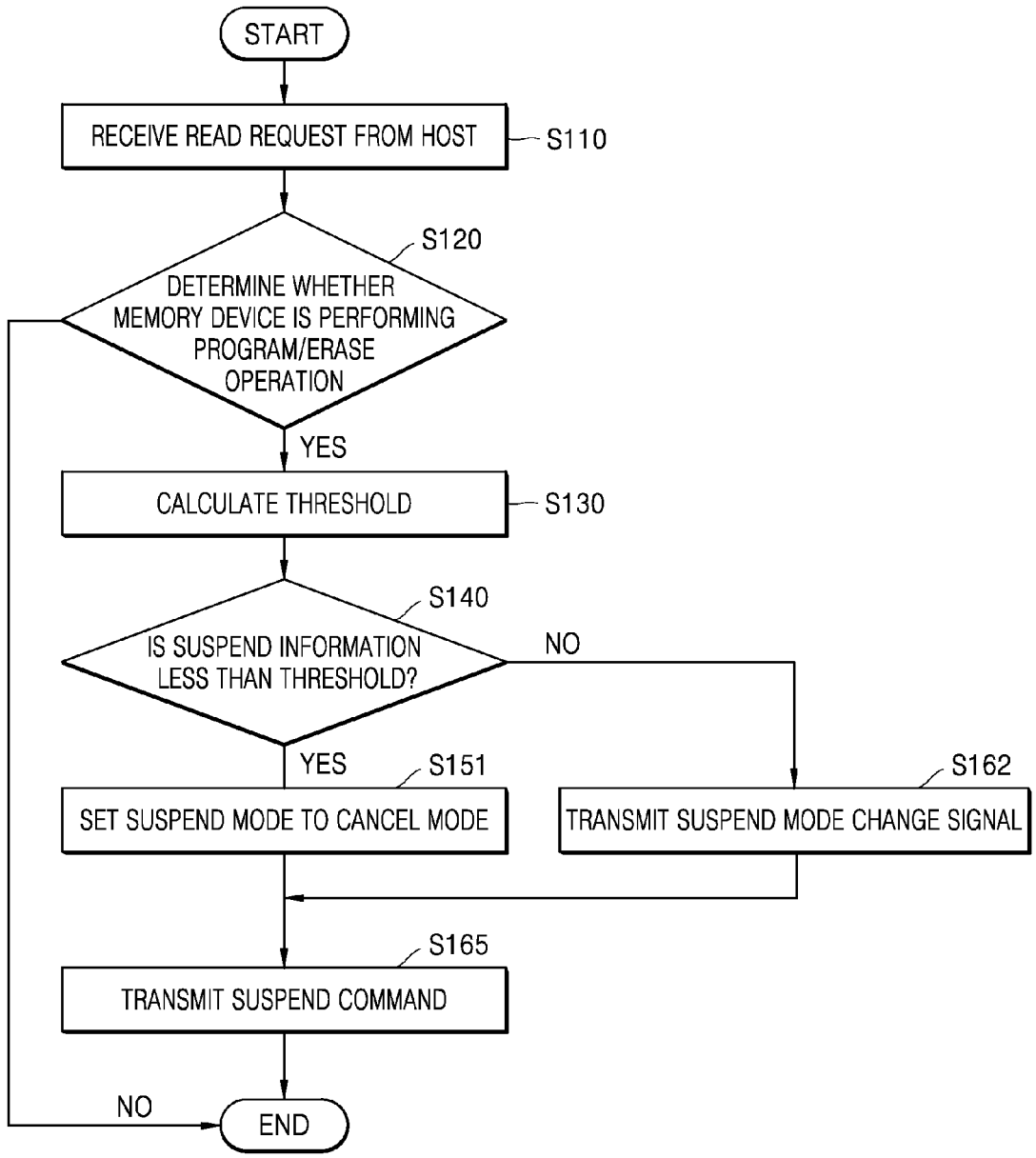
FIG. 9B is a flowchart summarizing a method of setting a suspend mode according to an embodiment of the inventive concept.

FIG. 9A is a flowchart summarizing a method of communicating a suspend mode change signal according to embodiments of the inventive concept, and FIG. 9B is a flowchart summarizing a method of setting the suspend mode according to embodiments of the inventive concept. Here again, some of the method steps included in the methods of FIGS. 9A and 9B have been described in relation to one or more of the foregoing embodiments. (See, e.g., FIG. 4).

Referring to FIG. 9A, when a determination is made that suspend information info_sp is not less than a threshold th (S140=NO), the memory controller 100 may communicate (or transmit) a suspend mode change command CMD_md to the memory device 300 (S161). Here, the suspend mode change command CMD_md may be a command based on the suspend mode change information info_md generated by the suspend operation manager 130 described above. Thereafter, the memory controller 100 may communicate a suspend command CMD_sp. According to an embodiment of the inventive concept, the memory controller 100 may communicate the suspend command CMD_sp and then communicate the suspend mode change command CMD_md.

Otherwise, when a determination is made that the suspend information info_sp is less than the threshold th (S140=YES), the memory controller 100 may communicate (or transmit) a suspend command CMD_sp to the memory device 300. In other words, when it is appropriate (e.g., faster data access operations are desired) for the memory device 300 to perform a suspend operation using the cancel mode, the memory controller 100 may communicate only the suspend command CMD_sp, because the cancel mode may have been previously set as a default mode for execution of the suspend operation by the memory device 300. However, when it is appropriate (e.g., less stress on the constituent memory cells are desired) for the memory device 300 to perform a suspend operation using the on-going mode, the memory controller 100 may communicate the suspend mode change command CMD_md together with the suspend command CMD_sp.

With the embodiment of FIG. 9A in mind, the embodiment of FIG. 9B assumes that the memory controller 100 can not detect a default mode for execution of a suspend operation by the memory device 300. Accordingly, when a determination is made that the suspend information info_sp is less than the threshold th (S140=YES), the memory controller 100 may communicate a command CMD that sets (or resets) the suspend mode to the cancel mode (S151). Otherwise, when a determination is made that the suspend information info_sp is not less than the threshold th (S140=NO), the memory controller 100 may communicate a command CMD for setting the suspend mode to the on-going mode (S162). Thereafter, the memory controller 100 may communicate a suspend command CMD_sp to control the memory device 300 such that the memory device 300 performs a suspend operation according to the set suspend mode (S165).

Figure 10:
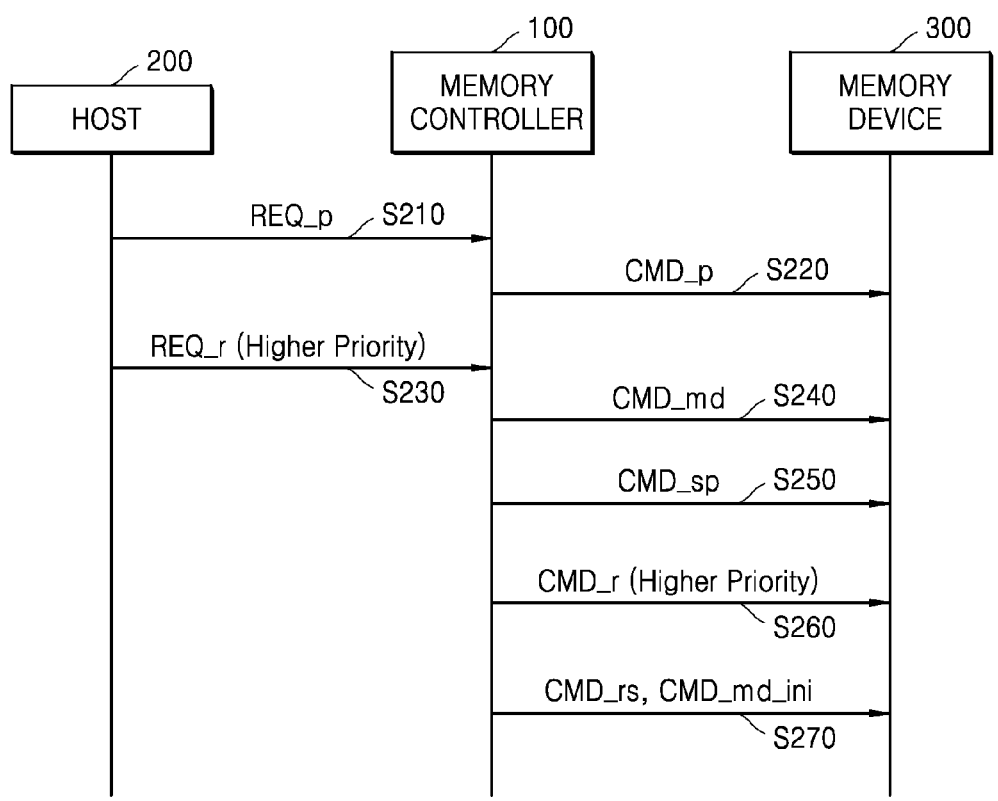
FIG. 10 is a sequence diagram further illustrating in one example the operation of a memory system according to an embodiment of the inventive concept.

FIG. 10 is a conceptual diagram illustrating a sequence of related operations performed within the memory system 10 of FIG. 1 according to embodiments of the inventive concept.

Initially, it is assumed that the host 200 communicates a program request REQ_p to the memory controller 100 (S210). In response to the program request REQ_p, the memory controller 100 communicates a corresponding program command CMD_p to the memory device 300 (S220). Here, the memory controller 100 may determine that the memory device 300 is currently performing a program operation as the result of the program command CMD_p being communicated. Accordingly, when the memory controller 100 subsequently receives a higher priority read request REQ_r, it may determine that a suspend operation is necessary and communicate corresponding command(s) to the memory device 300.

That is, upon receiving the higher priority read request REQ_r from the host 200 (S230), the memory controller 100 may communicate a suspend mode change command CMD_md (S240) and a suspend command CMD_sp to the memory device 300 (S250). Alternately, depending on the circumstances, the step of communicating the suspend mode change command CMD_md to the memory device 300 may be omitted. For example, the memory controller 100 may not need to communicate the suspend mode change command CMD_md when suspend information is less than a calculated threshold th.

In response to the foregoing commands, the memory device 300 may suspend the execution of the program operation, and execute the requested read operation (S260). When the memory device 300 completes execution of the read operation indicated by the read command CMD_r, the memory controller 100 may communicate a resume command CMD_rs and a mode initialization command CMD_md_ini (S270), where the mode initialization command CMD_md_ini is a command used to initialize the suspend mode of the memory device 300 to a default mode when the suspend mode has been set to a state other than the default mode.

According to certain embodiments of the inventive concept, the methods described above in relation to FIGS. 4 through 10, inclusive, may be used to control the operation of the memory device 300. In this regard, one or more programs defining such methods may be stored using a recording medium internal to and/or external from the memory controller 100. Such recording medium may be a non-transitory computer-readable recording medium. For example, the recording medium may be implemented by at least one of the internal memory 140 and the suspend operation manager 130 included in the memory controller 100. Alternatively, the recording medium may be provided external to the memory controller 100.

Figure 11A:
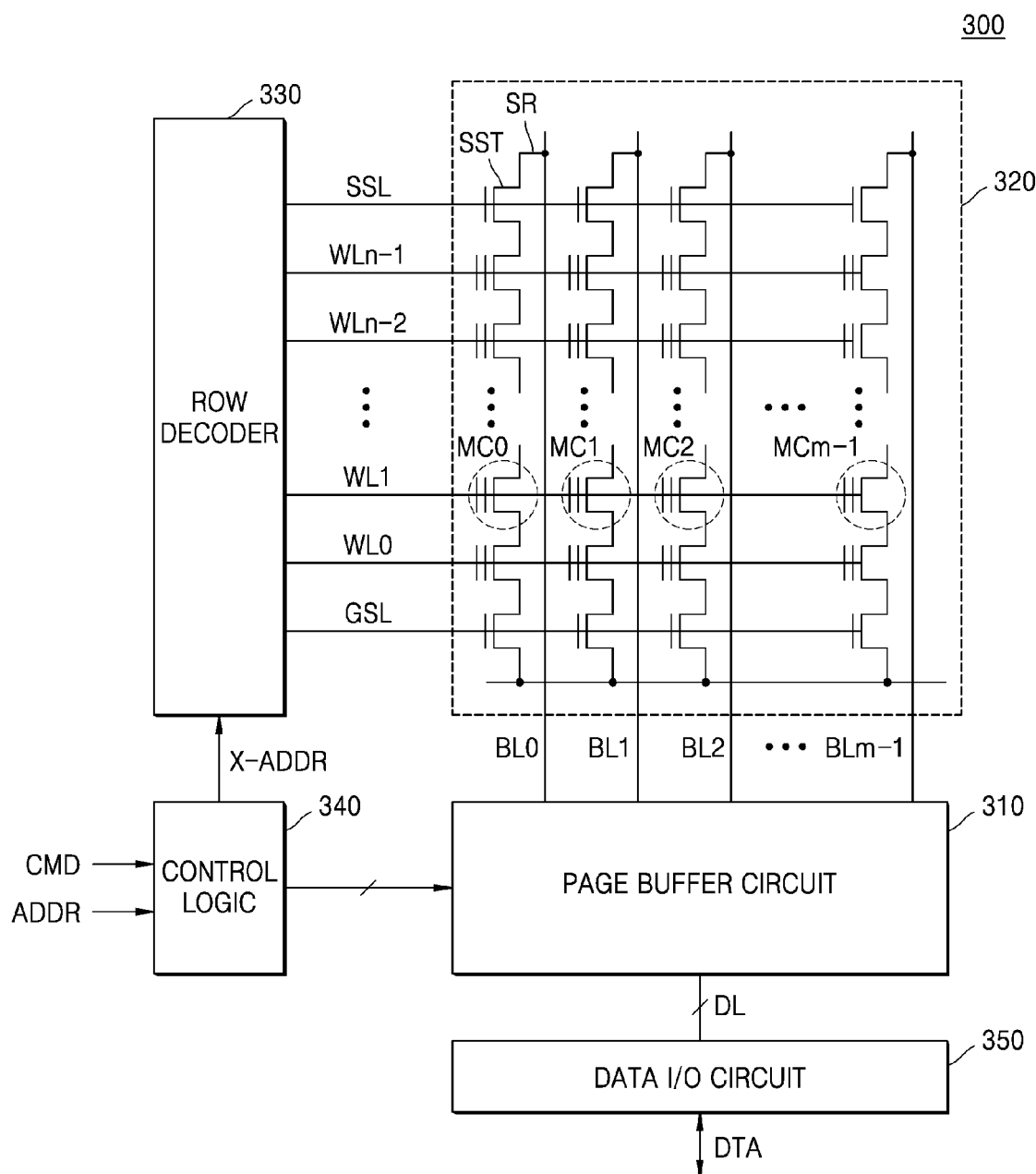
FIG. 11A is a block diagram of a memory device according to an embodiment of the inventive concept.
Figure 11B:
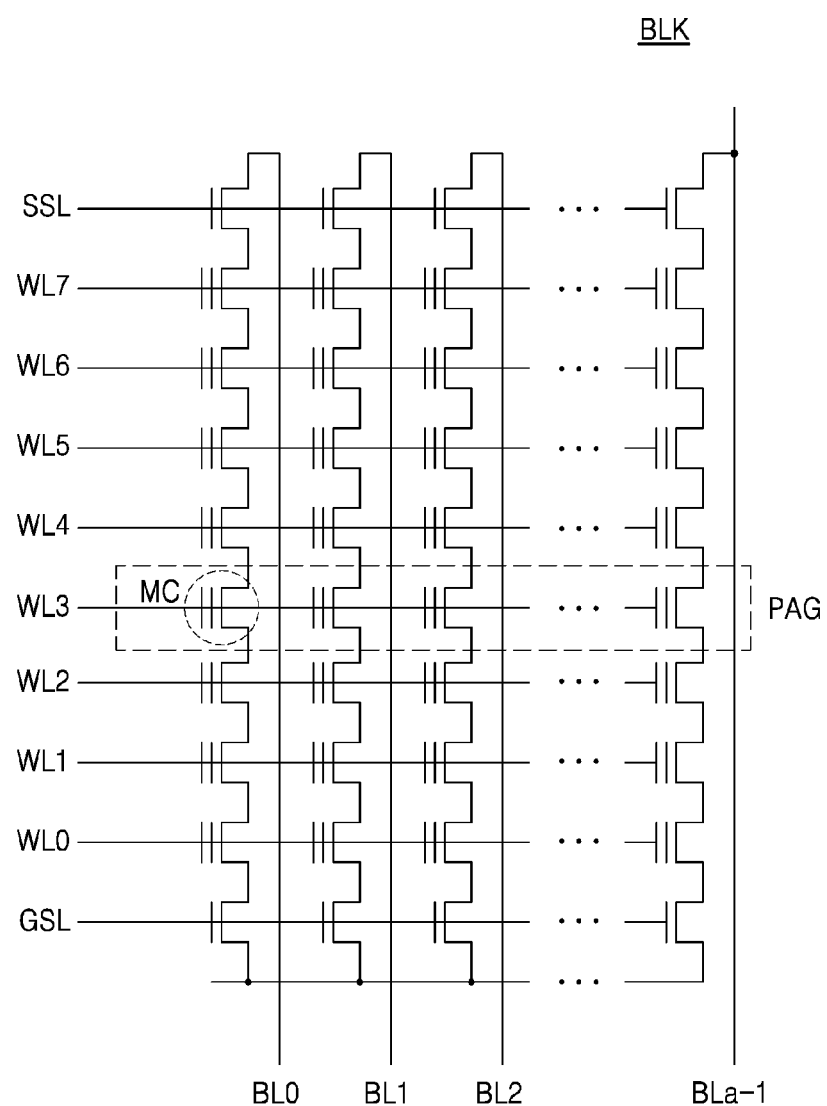
FIG. 11B is a circuit diagram of a memory block according to an embodiment of the inventive concept.
Figure 11C:
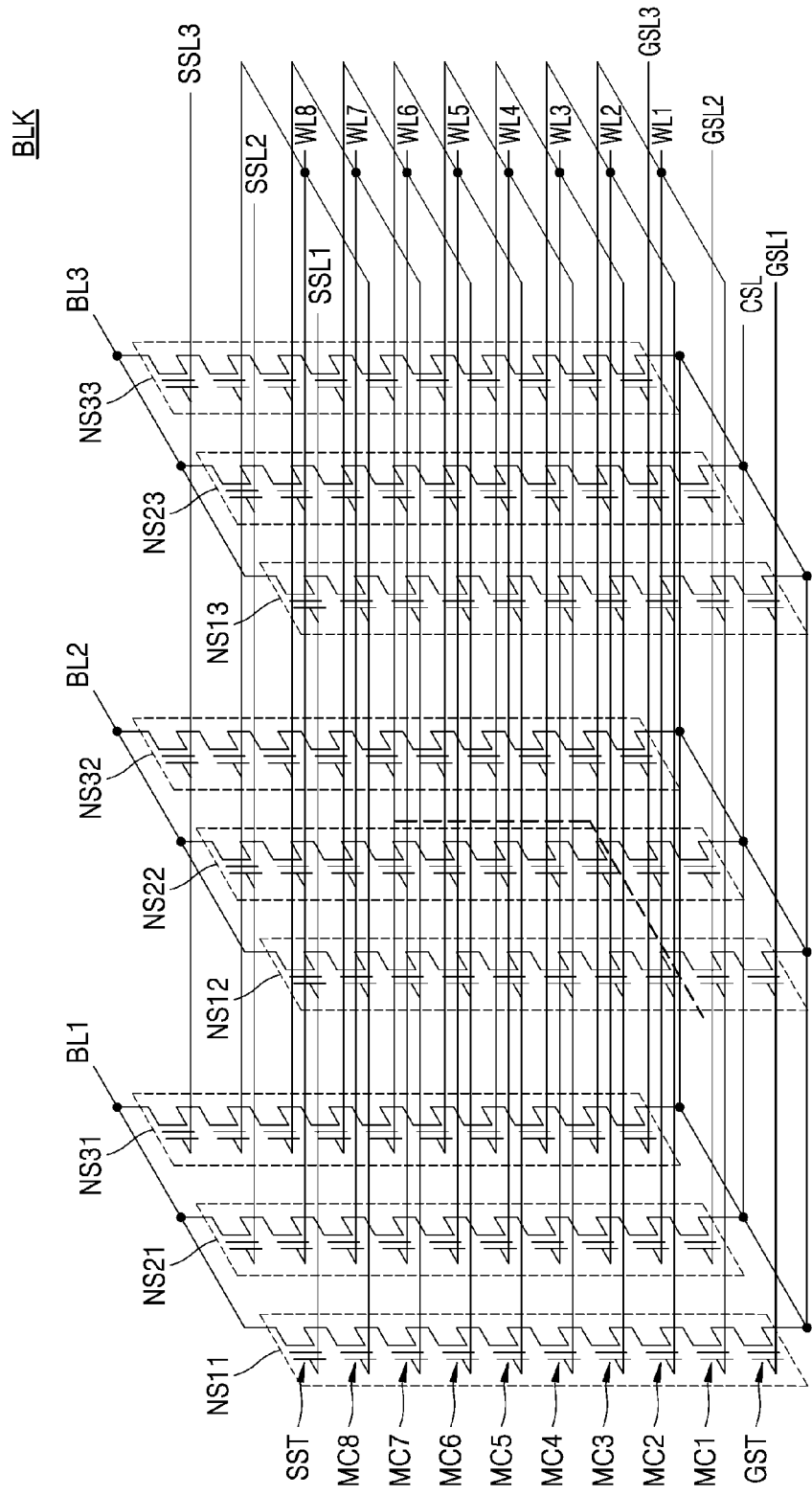
FIG. 11C is a circuit diagram of another example of the memory block according to an embodiment of the inventive concept.
Figure 11D:
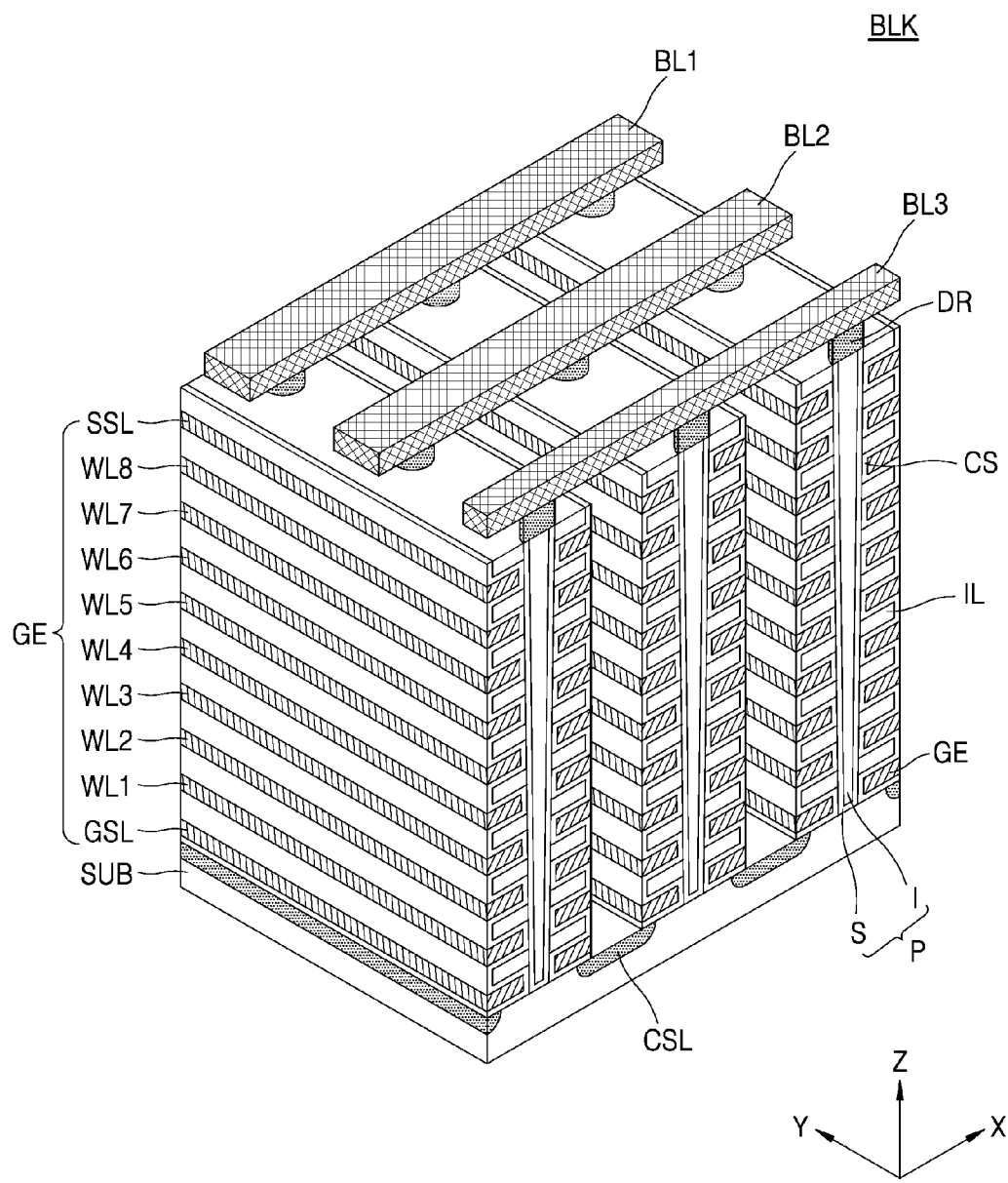
FIG. 11D is a perspective view of the memory block of FIG. 11C.
Figure 11E:
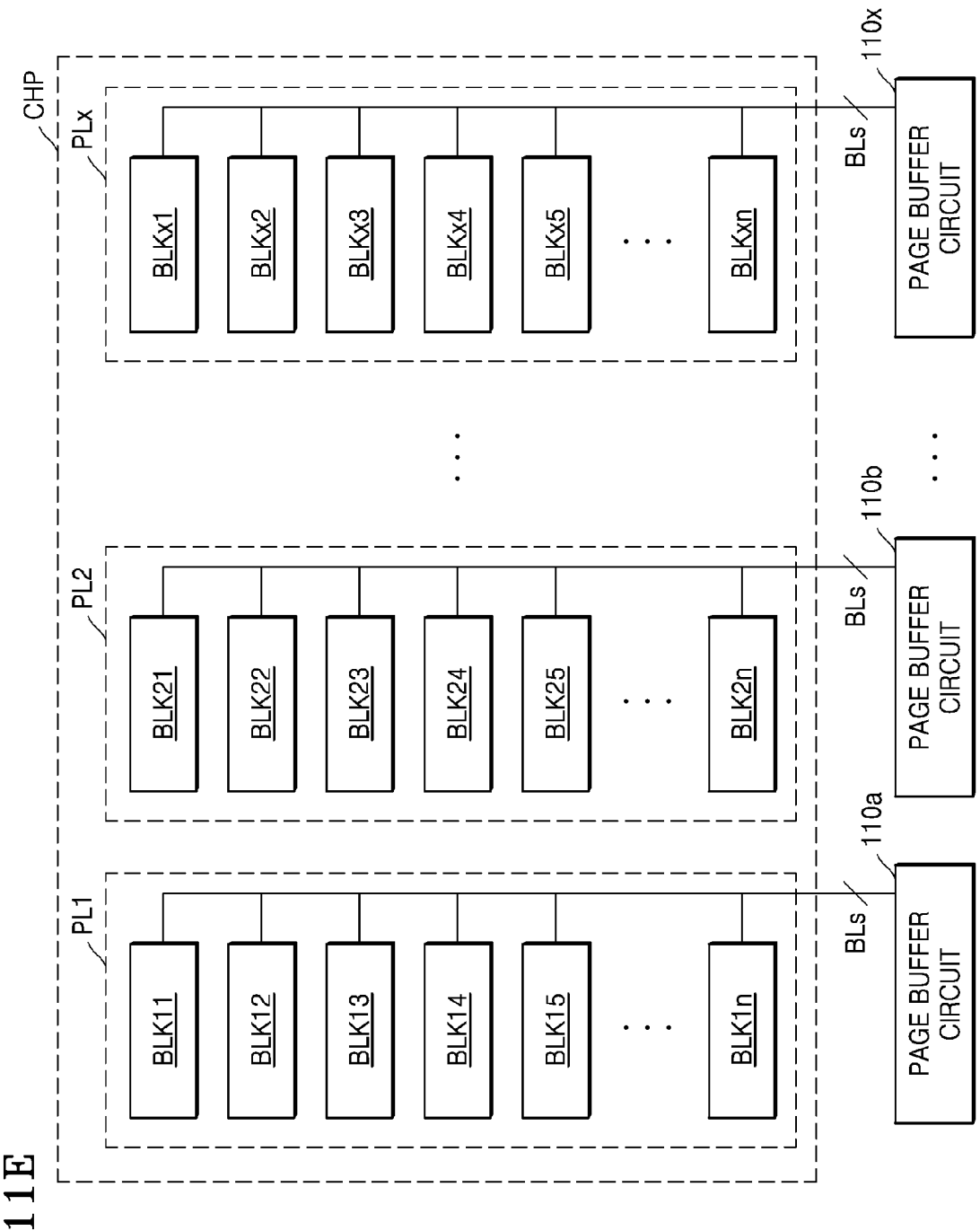
FIG. 11E is a block diagram of a memory plane and a memory chip, according to an embodiment of the inventive concept.

FIG. 11A is a block diagram of the memory device 300 according to an embodiment of the inventive concept, FIG. 11B is a circuit diagram of a memory block according to an embodiment of the inventive concept, FIG. 11C is a circuit diagram of another example of the memory block according to an embodiment of the inventive concept, FIG. 11D is a perspective view of the memory block of FIG. 11C, and FIG. 11E is a block diagram of a memory plane and a memory chip according to an embodiment of the inventive concept.

Referring to FIG. 11A, the memory device 300 may include a page buffer circuit 310, a memory cell array 320, a row decoder 330, a control logic 340, and a data input/output (I/O) circuit 350.

The control logic 340 may receive a command CMD and an address ADDR from the memory controller 100, and the command CMD may include various commands described above in the embodiments of the inventive concept. For example, the command CMD may include a suspend command CMD_sp, a suspend mode change command CMD_md, a suspend mode initialization command CMD_md_ini, and data operation commands (CMD_r, CMD_p, and CMD_e). The control logic 340 may perform a suspend operation by controlling the row decoder 330 and the page buffer circuit 310 based on the command CMD and the address ADDR.

In response to the command CMD received from the memory controller 100, the control logic 340 may perform a suspend operation for every memory unit of the memory cell array 320. Herein, the memory unit indicates a configuration including a plurality of memory cells MC, and for example, the suspend operation may be performed in units of memory page (PAG of FIG. 11B), memory block (BLK of FIGS. 11B, 11C, 11D, and 11E), memory plane (PL of FIG. 11E), or memory chip (CHP of FIG. 11E). For example, the control logic 340 may perform the suspend operation on certain memory units corresponding to the received command CMD. As another example, the control logic 340 may perform the suspend operation on certain memory chips CHP corresponding to the received command CMD. However, the control logic 340 is not limited thereto and may perform the suspend operation on various memory units.

FIGS. 11B to 11E are to describe various memory units.

Referring to FIG. 11B, the memory cell array 320 may be a memory cell array of a horizontal NAND flash memory and include a plurality of memory blocks BLK. Each memory block BLK may include a plurality of pages PAG including a number a of memory cells MC in a direction orthogonal to each of bit lines BL0 to BLa-1.

A NAND flash memory device having a structure as shown in FIG. 11B performs an erase operation in block units and performs a program operation in units of page PAG corresponding to each of word lines WL0 to WL7. FIG. 11B shows an example in which one block BLK includes eight pages PAG with respect to eight word lines WL0 to WL7. However, memory blocks BLK in the memory cell array 320 according to an embodiment of the inventive concept may include numbers of memory cells MC and pages PAG that are different from the numbers of memory cells MC and pages PAG shown in FIG. 11B.

Referring to FIG. 11C, the memory cell array 320 may be a memory cell array of a vertical NAND flash memory and include a plurality of memory blocks BLK. Each memory block BLK may include a plurality of NAND strings NS11 to NS33, a plurality of word lines, e.g., first to third word lines WL1 to WL8, a plurality of bit lines, e.g., first to third bit lines BL1 to BL3, a plurality of ground select lines GSL1 to GSL3, a plurality of string select lines, e.g., first to third string select lines SSL1 to SSL3, and a common source line CSL. Herein, the number of NAND strings, the number of word lines, the number of bit lines, the number of ground select lines, and the number of string select lines may be variously changed according to embodiments.

The NAND strings NS11, NS21, and NS31 are provided between the first bit line BL1 and the common source line CSL, the NAND strings NS12, NS22, and NS32 are provided between the second bit line BL2 and the common source line CSL, and the NAND strings NS13, NS23, and NS33 are provided between the third bit line BL3 and the common source line CSL. Each NAND string (e.g., NS11) may include a string select transistor SST, a plurality of memory cells MC1 to MC8, and a ground select transistor GST.

NAND strings commonly connected to one bit line construct one column. For example, the NAND strings NS11, NS21, and NS31 commonly connected to the first bit line BL1 may correspond to a first column, the NAND strings NS12, NS22, and NS32 commonly connected to the second bit line BL2 may correspond to a second column, and the NAND strings NS13, NS23, and NS33 commonly connected to the third bit line BL3 may correspond to a third column.

NAND strings connected to one string select line construct one row. For example, the NAND strings NS11, NS12, and NS13 connected to a first string select line SSL1 may correspond to a first row, the NAND strings NS21, NS22, and NS23 connected to a second string select line SSL2 may correspond to a second row, and the NAND strings NS31, NS32, and NS33 connected to a third string select line SSL3 may correspond to a third row.

The string select transistor SST is connected to corresponding string select lines, i.e., the first to third string select lines SSL1 to SSL3. The plurality of memory cells MC1 to MC8 are connected to corresponding word lines, i.e., the first to eighth word lines WL1 to WL8, respectively. The ground select transistor GST is connected to corresponding ground select lines GSL1 to GSL3. The string select transistor SST is connected to corresponding bit lines, i.e., the first to third bit lines BL1 to BL3, and the ground select transistor GST is connected to the common source line CSL.

Word lines (e.g., WL1) of the same height are commonly connected to each other, the string select lines SSL1 to SSL3 are separated from each other, and the ground select lines GSL1 to GSL3 are also separated from each other. For example, when programming memory cells connected to the first word line WL1 and belonging to the NAND strings NS11, NS12, and NS13, the first word line WL1 and the first string select line SSL1 are selected. The ground select lines GSL1 to GSL3 may be commonly connected to each other.

Referring to FIG. 11D, each memory block BLK included in the memory cell array 320 is formed in a direction orthogonal to a substrate SUB. Although FIG. 11D shows that the memory block BLK includes two select lines GSL and SSL, eight word lines WL1 to WL8, and three bit lines BL1 to BL3, the memory block BLK may actually include a more or less number of select lines, a more or less number of word lines, and a more or less number of bit lines.

The substrate SUB has a first conductive type (e.g., a p type), and common source lines CSL elongated in a first direction (e.g., a Y direction) and doped with impurities of a second conductive type (e.g., an n type) are provided on the substrate SUB. A plurality of insulating layers IL elongated in the first direction are sequentially provided in a third direction (e.g., a Z direction) on a region of the substrate SUB between every two adjacent common source lines CSL and are spaced apart by a certain distance from each other in the third direction. For example, the plurality of insulating layers IL may include an insulating material such as silicon oxide.

A plurality of pillars P sequentially arranged in the first direction and penetrating the plurality of insulating layers IL in the third direction are provided on the region of the substrate SUB between the every two adjacent common source lines CSL. For example, the plurality of pillars P may come in contact with the substrate SUB by penetrating the plurality of insulating layers IL. In detail, a surface layer S of each pillar P may include a silicon material having the first conductive type and may function as a channel region. In addition, an internal layer I of each pillar P may include an insulating material such as silicon oxide, or an air gap.

A charge storage layer CS is provide along an exposed surface of the insulating layers IL, the pillars P, and the substrate SUB on the region between the every two adjacent common source lines CSL. The charge storage layer CS may include a gate insulating layer (or referred to as 'tunneling insulating layer'), a charge trap layer, and a blocking insulating layer. For example, the charge storage layer CS may include an oxide-nitride-oxide (ONO) structure. In addition, on the region between the every two adjacent common source lines CSL, a gate electrode GE such as select lines GSL and SSL and word lines WL1 to WL8 is provided on the exposed surface of the charge storage layer CS.

Drains or drain contacts DR are provided on the plurality of pillars P, respectively. For example, the drains or drain contacts DR may include a silicon material doped with impurities having the second conductive type. Bit lines BL1 to BL3 elongated in a second direction (e.g., an X direction) and arranged by being spaced apart by a certain distance from each other in the first direction are provided on the drains DR.

Referring to FIG. 11E, a plurality of planes PL1, PL2, ..., PLx included in the memory cell array 320 may include a plurality of memory blocks BLK11 to BLK1$n$, BLK21 to BLK2$n$, ..., BLKx1 to BLKxn connected to bit lines BLs, respectively. The plurality of memory blocks BLK11 to BLK1$n$, BLK21 to BLK2$n$, ..., BLKx1 to BLKxn may be one of the memory blocks BLK described above with reference to FIGS. 11B to 11D. In addition, the plains PL1, PL2, ..., PLx may include a plurality of pages PAG included in the plurality of memory blocks BLK11 to BLK1$n$, BLK21 to BLK2$n$, ..., BLKx1 to BLKxn. For example, the page buffer circuit 310 may input or output data DTA in units of plain PL. a memory chip CHP may include the plurality of plains PL1, PL2, ..., PLx. The memory chip CHP may be one unit packaged in a semiconductor manufacturing process.

According to an embodiment of the inventive concept, the memory controller 100 may communicate a first suspend command to a first chip included in the memory device 300 and communicate a second suspend command to a second chip included in the memory device 300. That is, the memory controller 100 may communicate individual suspend commands CMD_sp to different chips, respectively.

Figure 12:
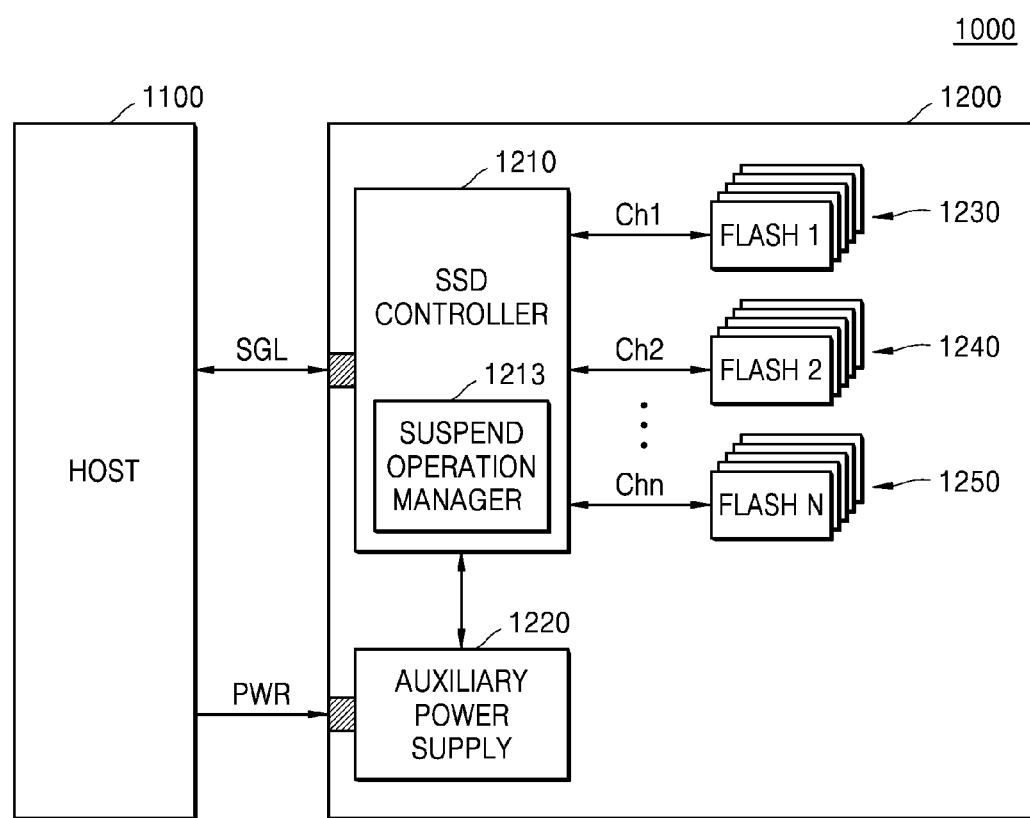
FIG. 12 is a block diagram illustrating a solid state drive (SSD) storage system that may incorporate a memory system according to an embodiment of the inventive concept.

FIG. 12 is a block diagram illustrating a solid state drive (SSD) storage system 1000 that may incorporate a memory system according to an embodiment of the inventive concept.

The SSD storage system 1000 may include a host 1100 and an SSD 1200. The SSD 1200 may give and take a signal SGL to and from the host 1100 through a signal connector and receive power PWR from the host 1100 through a power connector. The SSD 1200 may include an SSD controller 1210, an auxiliary power supply 1220, and a plurality of memory devices 1230, 1240, and 1250. For example, the SSD controller 1210 may be implemented so as to perform the methods of controlling a suspend operation performed by the memory device 300, which have been described above with reference to FIGS. 1 to 11E. As another example, the SSD controller 1210 may be implemented by the memory controller 100 or include the memory controller 100. In this case, the SSD controller 1210 may include a suspend operation manager 1213, and the suspend operation manager 1213 may be implemented by the suspend operation manager 130 described above with reference to FIGS. 1 to 11E. The plurality of memory devices 1230, 1240, and 1250 may be vertically stacked NAND flash memory devices, and each of the memory devices 1230, 1240, and 1250 may be packaged to one chip (CHP of FIG. 11E). In this case, at least one of the plurality of memory devices 1230, 1240, and 1250 may be implemented by the memory device 300 described above with reference to FIGS. 1 to 11E.

According to an example embodiment of the inventive concept, read QoS and memory cell reliability may be improved by commanding a memory device to perform a suspend operation in one of different suspend modes based on at least one of a state of queuing require signals received from a host and suspend information indicating a suspend operation status in the memory device.

As described above, example embodiments are disclosed with reference to the drawings and the description. Although particular terms are used to describe the embodiments in the specification, these terms are used to describe the technical idea of the inventive concept but are not used to limit the meaning or limit the scope of the inventive concept in the claims. While the inventive concept has been particularly shown and described with reference to embodiments thereof, it will be understood that various changes in form and details may be made therein without departing from the spirit and scope of the following claims.

What is claimed is:

1. A solid state drive (SSD) comprising:
   a first memory configured to perform a suspend operation based on a plurality of suspend modes including a first suspend mode and a second suspend mode; and
   a controller configured to receive a read request from an external device, and configured to provide a suspend command and a suspend mode change command to the first memory in response to the read request while the first memory performs a program operation or an erase operation,
   wherein the first memory is configured to select one of the plurality of suspend modes based on the suspend mode change command, and configured to selectively suspend the program operation or the erase operation based on the selected one of the plurality of suspend modes in response to the suspend command.

2. The SSD of claim 1, wherein, in the first suspend mode, the first memory executes a read operation after the first memory immediately suspends the program operation or the erase operation.

3. The SSD of claim 1, wherein, in the second suspend mode, the first memory executes a read operation, after the first memory completes a current program operation or a current erase operation and before the first memory begins a next program operation or a next erase operation.

4. The SSD of claim 3, wherein the first memory performs the program operation or the erase operation in units of a memory page.

5. The SSD of claim 3, wherein the first memory performs the program operation or the erase operation in units of a memory block.

6. The SSD of claim 3, wherein the first memory performs the program operation or the erase operation in units of a memory plane.

7. The SSD of claim 3, wherein the first memory performs the program operation or the erase operation in units of a memory chip.

8. The SSD of claim 1, further comprising a second memory coupled to the controller,
   wherein the first memory communicates with the controller via a first channel, and the second memory communicates with the controller via a second channel.

9. The SSD of claim 1, wherein the controller includes a suspend operation manager configured to generate suspend mode change information based on suspend information associated with a requested suspend operation to be performed by the first memory.

10. The SSD of claim 1, wherein the first memory is a non-volatile memory.

11. The SSD of claim 1, wherein the controller includes a processor coupled to the first memory.

* * * * *